United States Patent
Suehiro et al.

(10) Patent No.: US 8,947,442 B2
(45) Date of Patent: Feb. 3, 2015

(54) IMAGE DISPLAY APPARATUS, DISPLAY CONTROL METHOD, AND DISPLAY CONTROL PROGRAM

(75) Inventors: Masako Suehiro, Tokyo (JP); Takeshi Misawa, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 1124 days.

(21) Appl. No.: 12/320,700

(22) Filed: Feb. 2, 2009

(65) Prior Publication Data
US 2009/0199226 A1  Aug. 6, 2009

(30) Foreign Application Priority Data
Feb. 4, 2008  (JP) ................................ 2008-024083

(51) Int. Cl.
G06F 15/00 (2006.01)
G06T 1/00 (2006.01)
G06F 17/30 (2006.01)

(52) U.S. Cl.
CPC ...................................... G06F 17/30 (2013.01)
USPC .................... 345/501; 725/9; 725/10; 725/13

(58) Field of Classification Search
None
See application file for complete search history.

(56) References Cited

U.S. PATENT DOCUMENTS

| | | | | |
|---|---|---|---|---|
| 7,298,905 B2 * | 11/2007 | Kondo et al. | ................. | 382/190 |
| 7,418,116 B2 * | 8/2008 | Fedorovskaya et al. | ....... | 382/118 |
| 7,822,233 B2 * | 10/2010 | Nagaoka et al. | .............. | 382/118 |
| 7,834,912 B2 * | 11/2010 | Yoshinaga et al. | ......... | 348/222.1 |
| 7,870,023 B2 * | 1/2011 | Ozer et al. | ................... | 705/14.4 |
| 7,904,831 B2 * | 3/2011 | Kizaki | .......................... | 715/838 |
| 8,447,653 B2 * | 5/2013 | Veach et al. | ............... | 705/14.71 |
| 2002/0078447 A1 | 6/2002 | Mizutome et al. | | |
| 2003/0083052 A1 | 5/2003 | Hosaka | | |

(Continued)

FOREIGN PATENT DOCUMENTS

| | | |
|---|---|---|
| GB | 2410359 (A) | 7/2005 |
| JP | 2000-76421 | 3/2000 |

(Continued)

OTHER PUBLICATIONS

Notification of Reason(s) for Refusal dated Feb. 13, 2012, with English translation.

(Continued)

*Primary Examiner* — Kee M Tung
*Assistant Examiner* — William Beutel
(74) *Attorney, Agent, or Firm* — McGinn IP Law Group, PLLC

(57) ABSTRACT

An image display apparatus, comprising:
an image display section which displays an image;
an attention decision section which determines a degree of attention of a user with respect to the image;
an image identifier extraction section which extracts a plurality of identifiers which are assigned to the image and indicate an attribute of the image;
an attention identifier detection section which detects an attention identifier from an attention image determined to have a high degree of attention of the user by the attention decision section; and
a display control section which detects an image to be displayed having the attention identifier from among the images to be displayed on the image display section, and performs a display control of the image display section so as to further increase the frequency at which the image to be displayed is displayed.

17 Claims, 16 Drawing Sheets

(56) References Cited

U.S. PATENT DOCUMENTS

| | | |
|---|---|---|
| 2003/0128389 A1* | 7/2003 | Matraszek et al. ............ 358/1.18 |
| 2005/0105780 A1* | 5/2005 | Ioffe ............................. 382/118 |
| 2005/0190295 A1 | 9/2005 | Mizutome et al. |
| 2005/0198661 A1 | 9/2005 | Collins et al. |
| 2005/0222981 A1* | 10/2005 | Lawrence et al. .................. 707/3 |
| 2006/0055977 A1* | 3/2006 | Shiota et al. ................. 358/1.18 |
| 2006/0155892 A1 | 7/2006 | Sudoh |
| 2007/0057933 A1* | 3/2007 | Ohno et al. ................... 345/204 |

FOREIGN PATENT DOCUMENTS

| | | |
|---|---|---|
| JP | 2002-185881 | 6/2002 |
| JP | 2003-36476 A | 2/2003 |
| JP | 2003-174598 | 6/2003 |
| JP | 2004-318861 | 11/2004 |
| JP | 2005-267611 | 9/2005 |
| JP | 2006-81020 A | 3/2006 |
| JP | 2006-81020 (A) | 3/2006 |
| JP | 2007-57958 A | 3/2007 |
| JP | 2007-57958 (A) | 3/2007 |
| WO | WO 2004/030352 A1 | 4/2004 |

OTHER PUBLICATIONS

Japanese Office Action dated Dec. 25, 2012 with English translation.

* cited by examiner

| ADULT | |
|---|---|
| CHILD, BABY | ○ |
| FEMALE, GIRL | ○ |
| MALE, BOY | |
| ONE | ○ |
| MORE THAN ONE | |
| SMILING FACE | ○ |
| ANGRY FACE | |
| CRYING SAD FACE | |
| OTHER FACES | |
| OUTDOORS | ○ |
| INDOORS | |

| VIEWING TIME IS LONGER THAN AVERAGE | ○ |
|---|---|

| ADULT | |
|---|---|
| CHILD, BABY | ○ |
| FEMALE, GIRL | ○ |
| MALE, BOY | |
| ONE | ○ |
| MORE THAN ONE | |
| SMILING FACE | ○ |
| ANGRY FACE | |
| CRYING SAD FACE | |
| OTHER FACES | |
| OUTDOORS | ○ |
| INDOORS | |

| VIEWING TIME IS LONGER THAN AVERAGE | ○ |
|---|---|

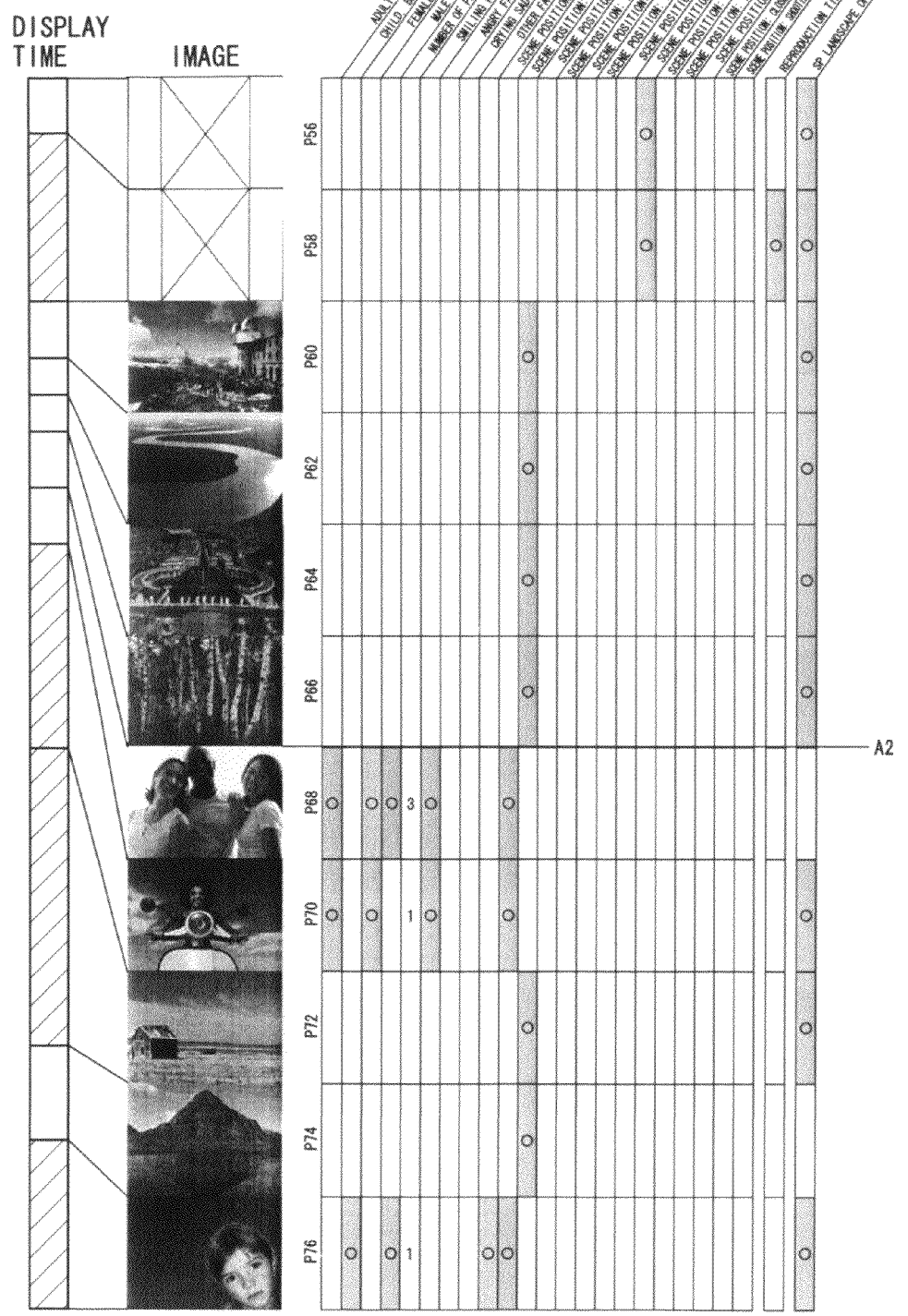

IMAGE DISPLAY APPARATUS, DISPLAY CONTROL METHOD, AND DISPLAY CONTROL PROGRAM

BACKGROUND OF THE INVENTION

1. Field of the Invention

The present invention relates to an image display apparatus, a display control method, and a display control program, and more particularly to an image display apparatus, a display control method, and a display control program for displaying an image in a predetermined order according to a user operation.

2. Description of the Related Art

Japanese Patent Application Laid-Open No. 2000-76421 discloses an emotion analysis system in which a correlation between facial and emotional expressions of an object person is accumulated in a mood database, and then a moving image input camera is used to capture a facial expression of the object person in real time so as to determine the mood of the object person.

Japanese Patent Application Laid-Open No. 2005-267611 discloses an image display apparatus in which an image of a user viewing a display unit is captured, a human face in the image is detected, and then a group of advertisement images to be displayed on the image display unit is selected based on the frequency of detection of a face category including a facial expression category.

Japanese Patent Application Laid-Open No. 2003-174598 discloses an information processing apparatus for outputting input data (image data and audio data) input from an input source such as a digital TV broadcast, in which input data is stored as viewing pattern by associating attribute information (input source information, channel information, and the like) of input data with a screen layout and an audio mode.

Japanese Patent Application Laid-Open No. 2004-318861 discloses an image viewer in which display data about viewing circumstances such as the number of viewers and their reactions (voice) when digital image data captured by a digital camera, or the like is actually displayed is obtained, the display data is converted to numerical points to be counted, and the image is selected so as to display the digital image data in the order starting with higher points.

SUMMARY OF THE INVENTION

A large-capacity image recording device allows a large number of images to be hold therein. However, in order to find an image which the user wants to view (to be displayed) from among many images and display the image on the screen, for example, the user has to repeat a frame advance operation which is troublesome in operation. In addition, the image which the user wants to view is different depending on a temporary mood of the user and thus is difficult to predict.

Japanese Patent Application Laid-Open No. 2000-76421 and Japanese Patent Application Laid-Open No. 2005-267611 analyze the face image of a user to estimate the user mood, and thus require a complicated apparatus including a camera and a database.

Japanese Patent Application Laid-Open No. 2003-174598 controls the screen layout of a digital TV broadcast and the like based on the past viewing pattern, but not displays an image based on a temporary mood of the user.

Japanese Patent Application Laid-Open No. 2004-318861 determines the display order of the digital image data based on a viewing circumstance when actually displayed in the past, but cannot display the image matching the current mood of the user. Moreover, Japanese Patent Application Laid-Open No. 2004-318861 cannot determine the display order based on points for an image to be displayed for the first time (not displayed in the past).

In view of such a circumstance, the present invention has been made, and an object of the present invention is to provide an image display apparatus, a display control method, and a display control program capable of displaying an image according to a user mood when the user wants to display the image.

In order to solve the above problems, the image display apparatus according to a first aspect of the present invention includes an image display section which displays an image; an attention decision section which determines a degree of attention of a user with respect to the image; an image identifier extraction section which extracts a plurality of identifiers which are assigned to the image and indicate an attribute of the image; an attention identifier detection section which detects an attention identifier from an attention image determined to have a high degree of attention of the user by the attention decision section; and a display control section which detects an image to be displayed having the attention identifier from among the images to be displayed on the image display section, and performs a display control of the image display section so as to further increase the frequency at which the image to be displayed is displayed.

According to the above first aspect, on the basis of the display time and the identifier of an individual image, the image having a long display, time and the image having a similar identifier are determined to have a high degree of attention, so as to increase the display frequency of the images having a high degree of attention, thereby allowing the display of the images matching the mood when the user is viewing the images.

In an exemplary aspect of the above first aspect, the image display apparatus includes an image display section configured to display an image, a frame advance instruction section configured to receive an input of a frame advance instruction of an image displayed on the image display section, an attention decision section configured to make a determination of a degree of attention of a user with respect to the image after a predetermined number of frames are advanced in response to the frame advance instruction, based on frame advance instructions received by the frame advance instruction section after an image display start instruction is detected, an attention identifier detection section configured to detect an attention identifier front an attention image determined to have a value of the degree of attention equal to or greater than a predetermined value by the attention decision section, and a display control section configured to detect images to be displayed having the attention identifier, perform a display control of the image display section so as to display only the images to be displayed in response to a frame advance instruction received after the display control is started, and clear a result of the determination of the degree of attention of the user made by the attention decision section if an image display end instruction is detected.

In another exemplary aspect of the above first aspect, the attention decision section measures a display time of an image displayed on the image display section after the display control is started, wherein, when a number of images having the measured display time shorter than a predetermined time exceeds a predetermined value, or when a ratio of the number of images having display time shorter than the predetermined time to a total number of images displayed on the image display section after the display control is started exceeds a predetermined value, the display control section terminates the display control, and wherein, when the display control section terminates the display control, the attention decision section makes the determination of the degree of attention of the user with respect to the image again.

The image display apparatus in accordance with a second aspect of the present invention, in the above first aspect, further includes a frame advance instruction section which receives an input of a frame advance instruction of an image to be displayed on the image display section, and is configured such that when the frame advance instruction is input during execution of the display control, only the images to be displayed are advanced and displayed on the image display section.

According to the above second aspect, on the basis of the display time and the identifier of an individual image, the image having a long display time and the image having a similar identifier are determined to have a high degree of attention, so as to display only the images having a high degree of attention in response to a frame advance operation, thereby allowing the frame advance display of the images matching the mood when the user is viewing the images.

The image display apparatus according to a third aspect of the present invention, in the above first or second aspect, is configured such that the attention decision section determines the degree of attention of the user with respect to the image based on the display time when the image is displayed or the number of times the image is displayed.

The image display apparatus according to a fourth aspect of the present invention, in the above first to third aspects, further includes an enlarged display instruction section which receives an instruction input for an enlarged display of the image and is configured such that the attention decision section determines the degree of attention of the user with respect to the image based on a presence or absence of an instruction input for the enlarged display or the number of times the instruction is input.

The image display apparatus according to a fifth aspect of the present invention, in the above first to fourth aspects, is configured such that the attention identifier detection section counts an identifier extracted from the attention image for each attribute, and detects the identifier as an attention identifier based on the total value.

The image display apparatus according to a sixth aspect of the present invention, in the above first to fifth aspects, is configured such that when the image displayed on the image display section after the display control is started is determined to have a low degree of attention by the attention decision section, the display control section terminates the execution of the display control.

According to the above sixth aspect, for example, if an incorrect attention decision is made, or if the tendency of the images the user wants to view during viewing of the images is changed, the frame advance display matching the mood of the user can be achieved by making the attention decision again.

The image display apparatus according to a seventh aspect of the present invention, in the above sixth aspect, is configured such that the attention decision section measures the display time of an image displayed on the image display section after the display control is started; and when the number of images having the measured display time shorter than a predetermined time exceeds a predetermined value, or when the ratio of the number of images having the measured display time shorter than a predetermined time to the total number of images displayed on the image display section after the display control is started exceeds a predetermined value, the attention decision section determines that the image displayed on the image display section after the display control is started is determined to have a low degree of attention.

The image display apparatus according to an eighth first aspect of the present invention, in the above first to seventh aspects, further includes an image analysis section which analyzes an image to which the identifier is not assigned, and assigns an identifier to the image.

According to the above eighth aspect, an image which has no identifier (analysis tag) to be used to make an attention decision is analyzed to assign an analysis tag thereto, thereby allowing the frame advance and display of the images matching the mood of the user regardless of the format of the image data file and the content of the tag information.

The image display apparatus according to a ninth aspect of the present invention, in the above eighth aspect, is configured such that the image analysis section obtains at least one piece of information from among an object appearing in the image, a scene setting, and a color trend, and assigns an identifier indicating the information to the image.

The image display apparatus according to a tenth aspect of the present invention, in the above first to ninth aspects, is configured such that the identifier is at least one piece of information indicating an object appearing in the image, a scene, and a shooting environment.

A display control method according to an eleventh aspect of the present invention is configured to include (1a) determining a degree of attention of a user with respect to an image displayed on an image display section; (1b) extracting an identifier which is assigned to an attention image determined to have a high degree of attention of the user and indicates a plurality of attributes of the attention image, and detecting an attention identifier from the attention image; (1c) detecting an image to be displayed having the attention identifier from among the images to be displayed on the image display section, and performing a display control of the image display section so as to further increase the frequency at which the image to be displayed is displayed.

The display control method according to a twelfth aspect of the present invention, in the above eleventh aspect, is configured to include (2a) receiving an input of a frame advance instruction of an image to be displayed on the image display section; and (2b) when the frame advance instruction is input during execution of the display control, instructing the image display section to advance and display only the image to be displayed.

The display control method according to a thirteenth aspect of the present invention, in the above eleventh or twelfth aspect, is configured such that in the step (1a), the degree of attention of the user with respect to the image is determined based on the display time the image is displayed, the number of times the image is displayed, a presence or absence of an instruction input for the enlarged display with respect to the image or the number of times the instruction is input.

The display control method according to a fourteenth aspect of the present invention, in the above eleventh to thirteenth aspects, is configured such that in the step (1b), an identifier extracted from the attention image is counted for each attribute, and the identifier is detected as an attention identifier based on the total value.

The display control method according to a fifteenth aspect of the present invention, in the above eleventh to fourteenth aspects, is configured to further include (5a) wherein when the image displayed on the image display section after the display control is started is determined to have a low degree of attention, the execution of the display control is terminated.

The display control method according to a sixteenth aspect of the present invention, in the above fifteenth aspect, is configured such that in the step (5a), the display time of an image displayed on the image display section after the display control is started is measured; and when the number of images having the measured display time shorter than a predetermined time exceeds a predetermined value, or when the ratio of the number of images having the measured display time shorter than a predetermined time to the total number of images displayed on the image display section after the display control is started exceeds a predetermined value, the image displayed on the image display section after the display control is started is determined to have a low degree of attention.

The display control method according to a seventeenth aspect of the present invention, in the above eleventh to sixteenth aspect, is configured to include (7a) which analyzes an image to which the identifier is not assigned, and assigns an identifier to the image.

The display control method according to a eighteenth aspect of the present invention, in the above seventeenth aspect, is configured such that in the step (7a), at least one piece of information is obtained from among an object appearing in the image, a scene setting, and a color trend, and an identifier indicating the information is assigned to the image.

The display control method according to a nineteenth aspect of the present invention, in the above eleventh to eighteenth aspect, is configured such that the identifier is at least one piece of information indicating an object appearing in the image, a scene, and a shooting environment.

A display control program according to a twentieth aspect of the present invention, causes a computer to provide an image display function which displays an image on an image display apparatus; an attention decision function which determines a degree of attention of a user with respect to the image; an image identifier extraction function which extracts an identifier which is assigned to the image and indicates a plurality of attributes of the image; an attention identifier detection function which detects an attention identifier from the attention image determined to have a high degree of attention of the user by the attention decision section; and a display control function which detects an image to be displayed having the attention identifier from the images to be displayed on the image display section, and executes a display control so as to further increase the frequency at which the image to be displayed is displayed.

The display control program according to a twenty-first aspect of the present invention, in the above twentieth aspect, further includes a frame advance instruction function which receives an input of a frame advance instruction of an image to be displayed on the image display section; and is configured such that when the frame advance instruction is input during execution of the display control, only the images to be displayed are advanced and displayed on the image display section.

The display control program according to a twenty-second aspect of the present invention, in the above twentieth or twenty-first aspect, is configured such that the attention decision by the attention decision function is performed based on the display time the image is displayed, or the number of times the image is displayed.

The display control program according to a twenty-third aspect of the present invention, in the above twentieth to twenty-second aspects, further includes an enlarged instruction function which receives an instruction input for an enlarged display of the image, and is configured such that the attention decision by the attention decision function is performed based on a presence or absence of an instruction input for the enlarged display or the number of times the instruction is input.

The display control program according to a twenty-fourth aspect of the present invention, in the above twentieth to twenty-third aspects, is configured such that an identifier extracted from the attention image is counted for each attribute, and the detection of an attention identifier is performed based on the total value.

The display control program according to a twenty-fifth aspect of the present invention, in the above twentieth to twenty-fourth aspects, is configured such that when the image displayed on the image display section after the display control is started is determined to have a low degree of attention by the attention decision function, the execution of the display control is terminated.

The display control program according to a twenty-sixth aspect of the present invention, in the above twenty-fifth aspect, is configured such that the display time of an image displayed on the image display section after the display control is started is measured; and when the number of images having the measured display time shorter than a predetermined time exceeds a predetermined value, or when the ratio of the number of images having the measured display time shorter than a predetermined time to the total number of images displayed on the image display section after the display control is started exceeds a predetermined value, the image displayed on the image display section after the display control is started is determined to have a low degree of attention.

The display control program according to a twenty-seventh aspect of the present invention, in the above twentieth to twenty-sixth aspects, further includes an image analysis function which analyzes an image to which the identifier is not assigned, and assigns an identifier to the image.

The display control program according to a twenty-eighth aspect of the present invention, in the above twenty-seventh aspect, is configured such that the image analysis function obtains at least one piece of information from among an object appearing in the image, a scene setting, and a color trend, and assigns an identifier indicating the information to the image.

The display control program according to a twenty-ninth aspect of the present invention, in the above twentieth to twenty-eighth aspects, is configured such that the identifier is at least one piece of information indicating an object appearing in the image, a scene, and a shooting environment.

According to the present invention, on the basis of the display time and the identifier of an individual image, the image having a long display time and the image having a similar identifier are determined to have a high degree of attention, so as to increase the display frequency of the images having a high degree of attention, thereby allowing the display of the images matching the mood when the user is viewing the images.

BRIEF DESCRIPTION OF THE DRAWINGS

FIGS. 7A and 7B are schematic views illustrating the display control method in accordance with the third embodiment of the present invention;

DETAILED DESCRIPTION OF THE PREFERRED EMBODIMENTS

Hereinafter, preferred embodiments of an image display apparatus, a display control method, and a display control program in accordance with the present invention will be described with reference to the accompanying drawings.

First Embodiment

Figure 1A:
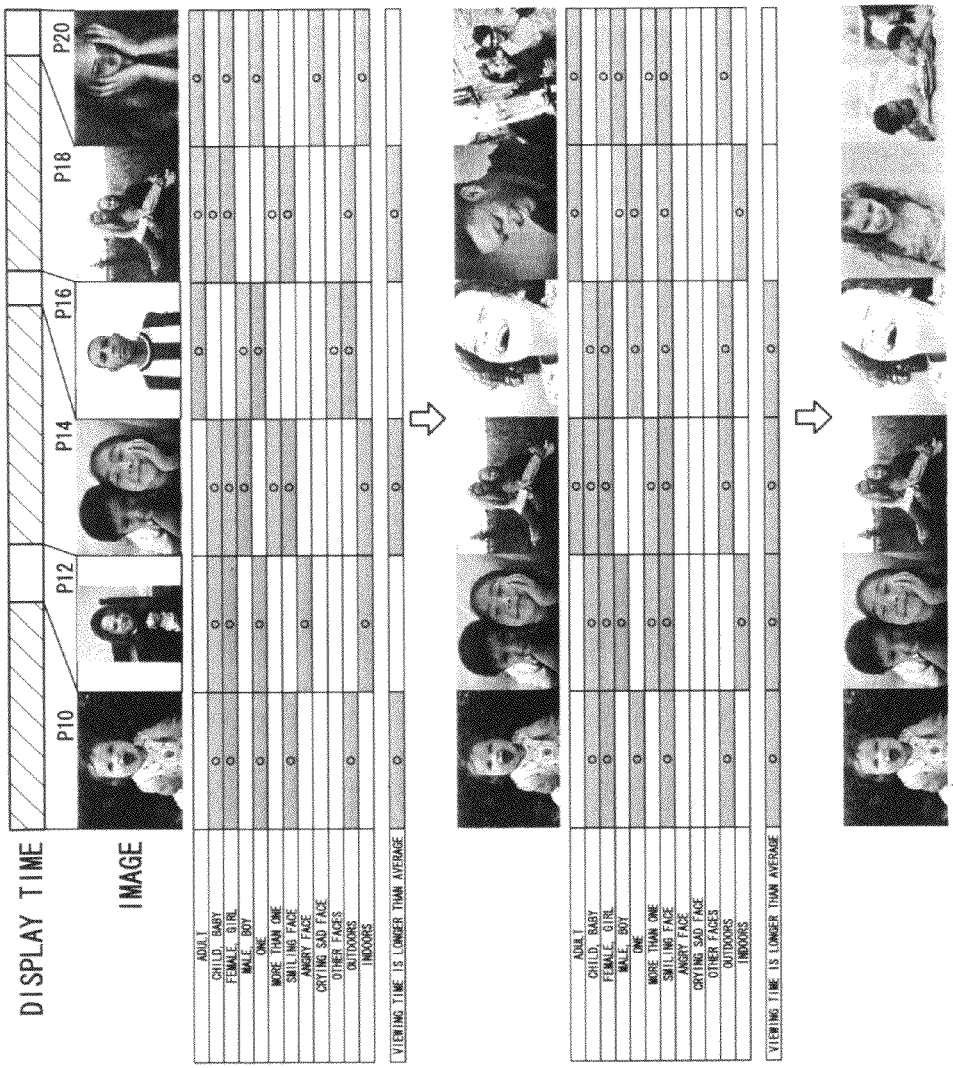
FIGS. 1A and 1B are schematic view illustrating a display control method in accordance with a first embodiment of the present invention.
Figure 1B:
Figure 1B:

FIG. 1A is a schematic view illustrating a display control method in accordance with a first embodiment of the present invention. FIG. 1B is an enlarged view of left character portion of FIG. 1A.

An image display apparatus 10 of the present embodiment displays still images in a predetermined order based on a frame advance operation of the user. A predetermined identifier is included in an image recorded in the image display apparatus 10. Here, the identifier is information indicating an attribute or a characteristic of the image and is recorded as auxiliary information (Exif tag information) of an image data file. More specifically, the identifier includes at least one piece of information such as basic image information; shooting/update time and date information; position information (GPS information); an angle of view; flash on/off information; an object appearing in an image (e.g., person, landscape); the number of photographed persons; attributes of a photographed person (e.g., male, female, adult, child, baby); facial expressions of a photographed person (smiling face, angry face, crying sad face, and other emotional faces); a shooting mode; scene settings (e.g., person, landscape, sport, night scene, firework, sunset glow, snow, beach, underwater, art gallery, party, close up of a flower, or shooting of a character); scene recognition results; a shooting environment (e.g., indoor, outdoor); and a color hue (maximum value, minimum value, distribution, and percentage of R, G, and B values). It should be noted that the identifier may include information other than the above.

The image display apparatus 10 measures the display time from when an individual image is displayed on the image display section 18 to when the image is switched to another image to be displayed thereon. When a predetermined number of frames have been advanced, the image display apparatus 10 determines the degree of attention for each image based on an average value (average display time) of the display time of a predetermined number of frames of images and the display time of an individual image. Then, when a next frame advance operation is performed, the number of images having an identifier assigned to an image whose degree of attention is determined to be high or the number of identifiers of an image group whose degree of attention is determined to be high is calculated. On the basis of the total value, frame advance control is performed so as to increase the display frequency of an image having an identifier with a large total value.

With reference to FIG. 1A, the display time of the images P10, P14, and P18 having an identifier of smiling face is longer than the average display time; while the display time of the images P12, P16, and P20 having an identifier of angry face, crying sad face, or other emotional faces is shorter than the average display time. The image display apparatus 10 determines that the image having an identifier of smiling face has a high degree of attention. When a frame advance operation is performed while the image P20 is being displayed, the image display apparatus 10 skips the images having an identifier of angry face, crying sad face, or other emotional faces, and performs the frame advance operation on only the images having the identifier of smiling face. Thereby, only the images matching the mood when the user is viewing the images can be displayed.

Figure 2:
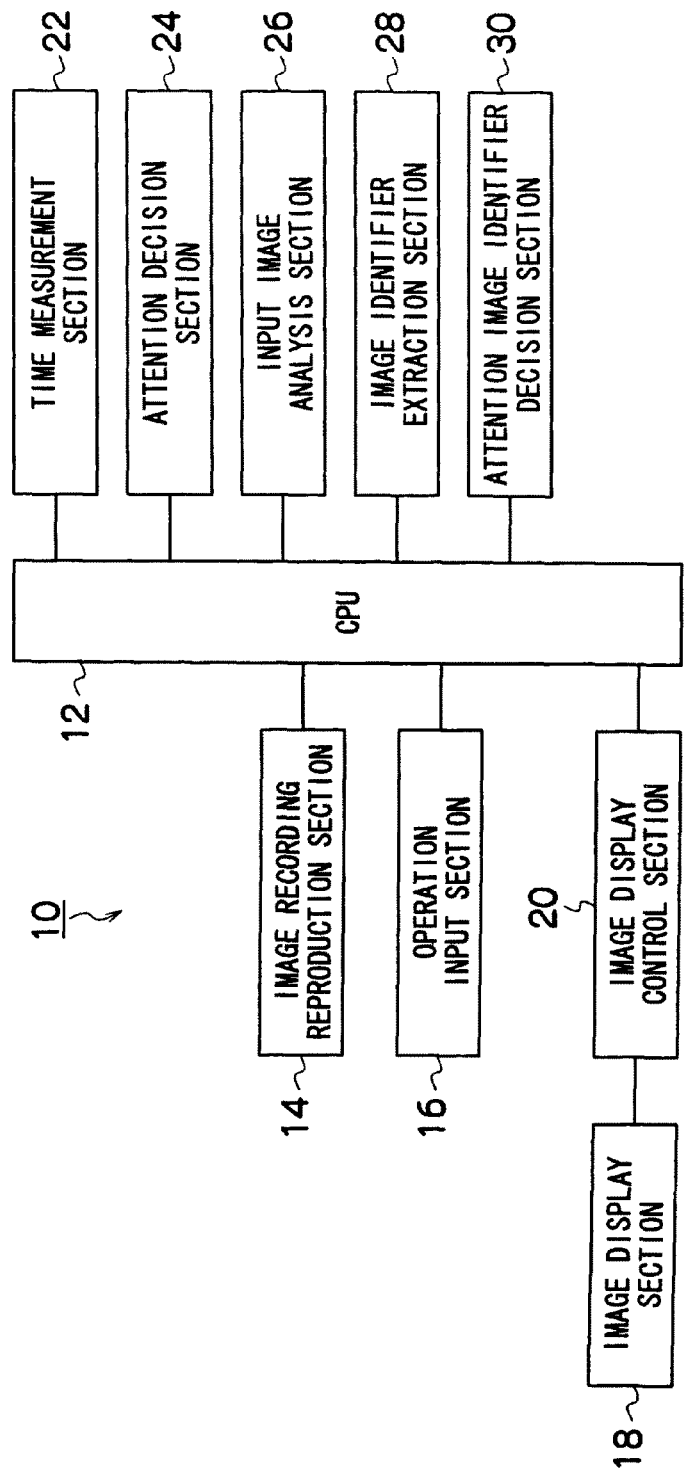
FIG. 2 is a block diagram illustrating an image display apparatus in accordance with the first embodiment of the present invention.

FIG. 2 is a block diagram illustrating the image display apparatus in accordance with the first embodiment of the present invention.

As shown in FIG. 2, the image display apparatus 10 in accordance with the present embodiment includes a CPU 12, an image recording reproduction section 14, an operation input section 16, an image display section 18, an image display control section 20, a time measurement section 22, an attention decision section 24, an input image analysis section 26, an image identifier extraction section 28, and an attention image identifier decision section 30.

The CPU 12 controls the entire operation of the image display apparatus 10 based on a predetermined program and executes various kinds of arithmetical operations.

The operation input section 16 includes various kinds of switches for a user to perform an operation or an input such as a display start switch for inputting an image display start instruction, a display termination switch for inputting an image display termination instruction, and a frame advance switch for inputting a frame advance instruction of the image displayed on the image display section 18. The CPU 12 controls the individual sections of the image display apparatus 10 based on an input signal from the operation input section 16 and performs display control of the image display section 18 and image recording control.

The image recording reproduction section 14 records an image electronically. As the image recording reproduction section 14, for example, a semiconductor memory card such as xD-Picture Card™ and SmartMedia™, a hard disk, a magnetic disk, an optical disk, or a magneto optic disk can be used.

The image display section 18 is, for example, a liquid crystal display (LCD) monitor or an organic electroluminescence (EL) monitor, and displays an image input from the image display control section 20.

The image display control section 20 reads an image recorded in the image recording reproduction section 14 based on an input from the operation input section 16, converts the image to data for display, and outputs the display data to the image display section 18. In addition, the image display control section 20 performs control on the image display section 18 and switching control of the display content in response to an instruction from the CPU 12.

The time measurement section 22 measures time.

The input image analysis section 26 analyzes an image input to the image recording reproduction section 14.

The attention decision section 24 determines whether the image has a high degree of attention based on the display time for each image displayed on the image display section 18.

Figure 3:
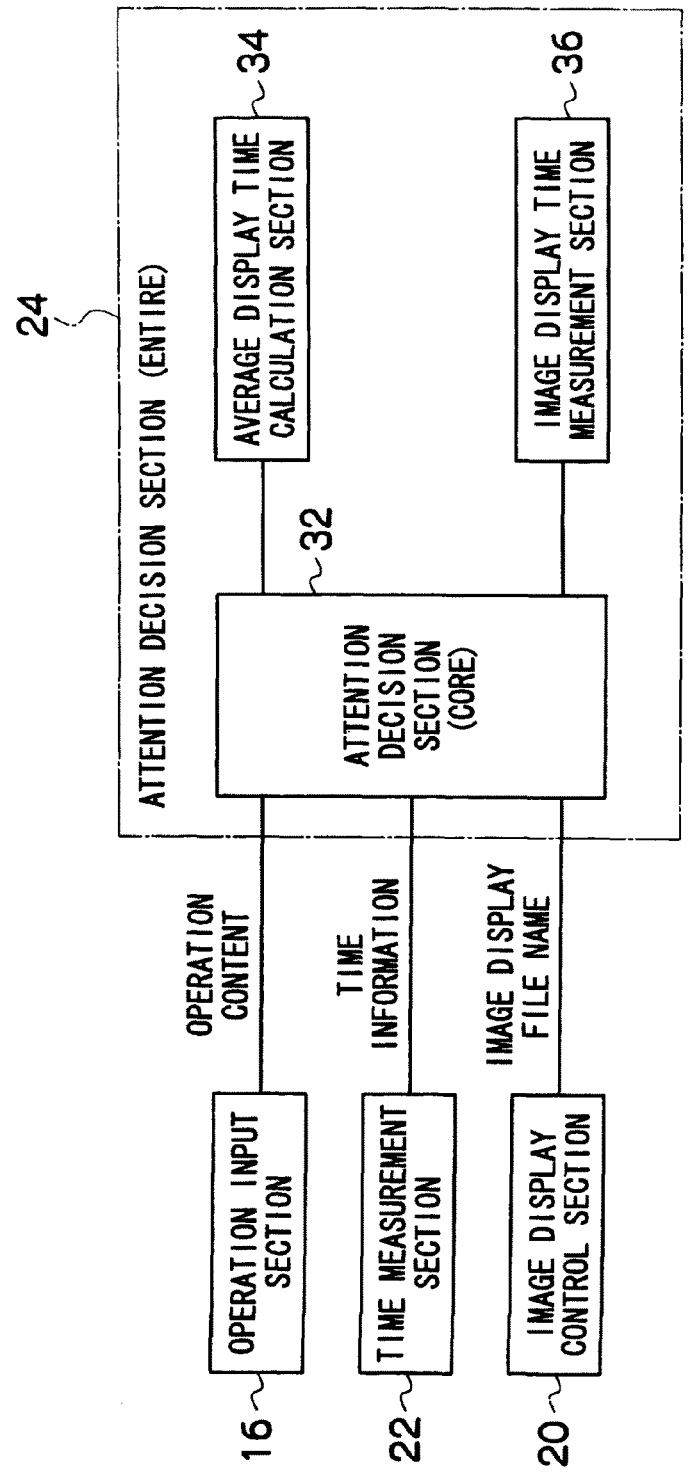
FIG. 3 is a data block diagram illustrating an attention decision section 24 in accordance with the first embodiment of the present invention.

FIG. 3 is a data block diagram illustrating the attention decision section 24.

As shown in FIG. 3, the attention decision section 24 includes an attention decision section (core section) 32, an average display time calculation section 34, and an image display time measurement section 36.

The image display time measurement section 36 obtains, from the time measurement section 22, time information indicating the time when an image is displayed on the image display section 18 and the time when the image is switched to another image for frame advance and measures the display time of the image. It should be noted that when image frame return operation is performed on the image and the same image is repeatedly displayed, the total value of the display time of the image may be measured.

The average display time calculation section 34 calculates the average value (average display time Ta) of the display time for each image measured by the image display time measurement section 36. Each time an image is frame-advanced, the average display time Ta is calculated and updated.

It should be noted that each time the image display start instruction is input, the display time of an individual image and the average display time Ta are calculated, and when the image display termination instruction is input, the display time and the average display time Ta are cleared.

The attention decision section (core section) 32 compares the average display time Ta and the display time of an individual image, and determines whether the image has a high degree of attention. For example, if the display time of an image is equal to or longer than the average display time Ta, the attention decision section (core section) 32 determines that the image has a high degree of attention. Alternatively, if the difference or fraction (ratio) between the display time of an image and the average display time Ta is equal to or greater than a predetermined value, the attention decision section (core section) 32 may determine that the image has a high degree of attention.

The image identifier extraction section 28 extracts the identifier assigned to the image which is determined to have a high degree of attention by the attention decision section 24.

The attention image identifier decision section 30 counts the identifier extracted from the image determined to have a high degree of attention based on the display time, and estimates the identifier having a high degree of attention of the user (attribute and characteristic of the image matching the current mood when the user is viewing the image). The attention image identifier decision section 30 counts the identifier of the image determined to have a high degree of attention based on the display time, and determines that the identifier having a large total value or a high total value order has a high degree of attention of the user.

With reference to FIG. 1A, "smiling face" is commonly assigned to the images P10, P14, and P18 having a long display time and determined to have a high degree of attention, and the total value of "smiling face" is the largest. Therefore, the attention image identifier decision section 30 determines that the identifier of "smiling face" has a high degree of attention of the user.

When a predetermined number of frames (hereinafter referred to as N frames) of images are displayed and then further a frame advance operation is performed, the image identifier extraction section 28 finds an image having a frame advance order of N displayed on the image display section 18 and extracts the identifier from the next frame (N+1) of image N+1.

The attention decision section 24 compares the identifier determined to have a high degree of attention of the user and the identifier extracted from the image N+1, and determines whether the image N+1 has a high degree of attention of the user (matches the current mood thereof).

More specifically, the attention decision section 24 compares the identifier determined to have a high degree of attention of the user and the identifier extracted from the image N+1, and if there is a mutually matched identifier (for example, the number of matched identifiers or the ratio of the number of identifiers is equal to or greater than a predetermined value), the attention decision section 24 determines that the image N+1 has a high degree of attention of the user.

On the contrary, if there is no identifier matched between the identifier determined to have a high degree of attention of the user and the identifier extracted from the image N+1 (for example, the number of matched identifiers or the ratio of the number of identifiers is less than a predetermined value), the attention decision section 24 determines that the image N+1 has a low degree of attention of the user. Subsequently, the attention decision section 24 takes the (N+2)th or later frame of image and repeats the extraction of an identifier thereof and the attention decision process based on the identifier until an image having a high degree of attention of the user is detected.

When a frame advance operation is detected after a predetermined number of frames of images are displayed, on the basis of the determination result of the degree of attention by the attention decision section 24, the CPU 12 instructs the image display section 18 to display image data determined to have a high degree of attention of the user from among image data later in frame advance order.

It should be noted that the attention decision of the user is made by binary decision as described above, but may be made such that, for example, the degree of attention of the user with respect to the image is converted to a numerical value (e.g., 0, . . . , 100) based on the number of identifiers matched between the identifier determined to have a high degree of attention of the user and the identifier extracted from the image N+1 and later or the ratio of the number of identifiers, and if the value of the degree of attention is equal to or greater than a predetermined value, the image is to be frame advanced.

Alternatively, when the degree of attention of the user is converted to a numerical value, a specific identifier may be weighted.

Figure 4:
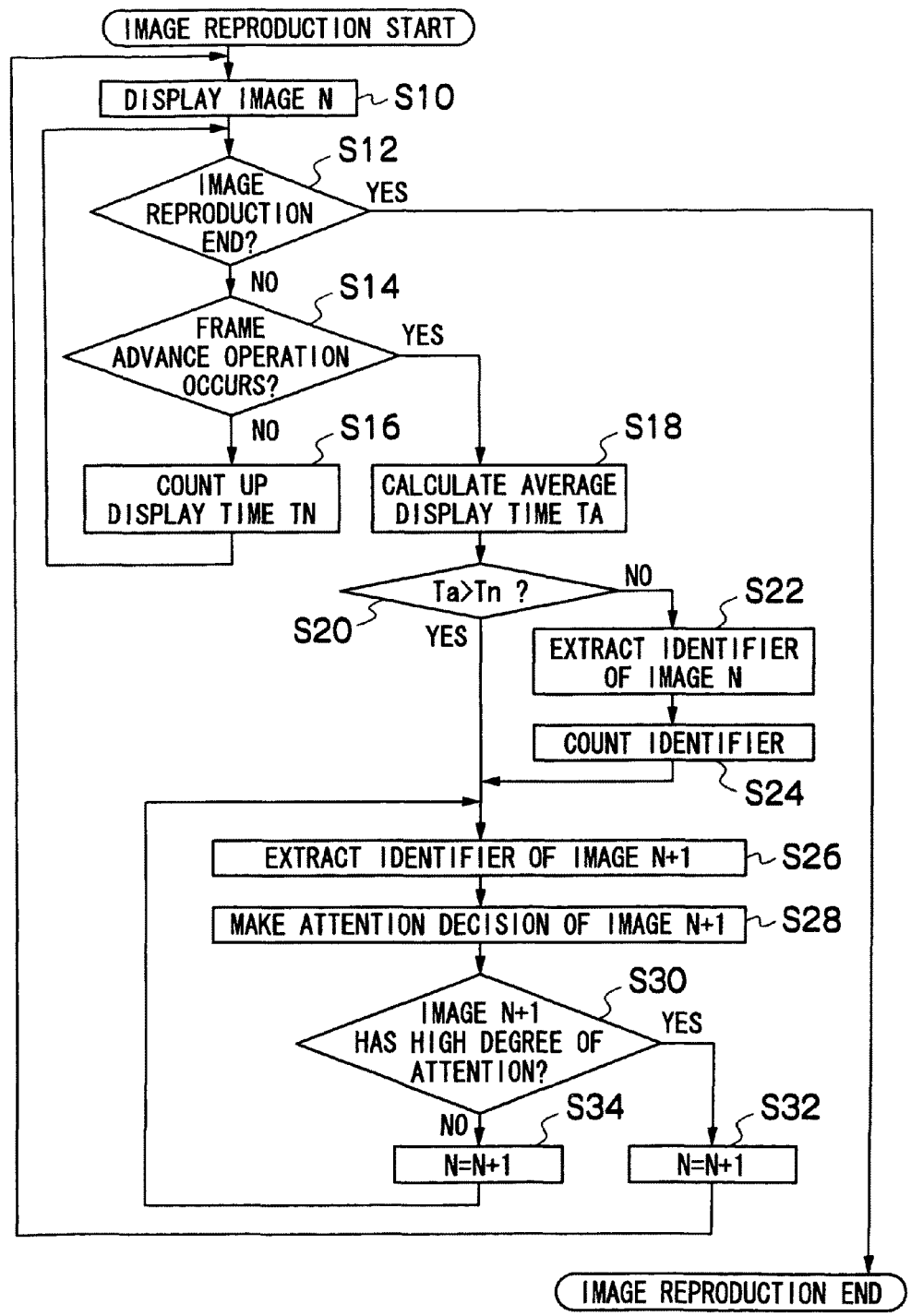
FIG. 4 is a flowchart illustrating a display control method in accordance with the first embodiment of the present invention.

FIG. 4 is a flowchart illustrating the display control method in accordance with the first embodiment of the present invention.

As shown in FIG. 4, when the image display start instruction of an image is detected, a first frame of image 1 is displayed on the image display section 18. Then, the images 1, . . . , N−1 are displayed based on the frame advance operation from the operation input section 16. Here, the images 1, . . . , N−1 are advanced and displayed, for example, in the order of time and date when the image data was shot, in the order of time and date when the image data was updated, in the order of file name, in the order of size, or in the order of type (for each file format). Then, when the individual images 1, ..., N−1 are displayed on the image display section 18, the display time (T1, ..., T (n−1)) from the time when an image is displayed to the time when the image was advanced is measured (counted). In addition, the identifiers of the images 1, ..., N−1 are extracted.

Next, an Nth frame of image N is read from the image recording reproduction section 14 and is displayed on the image display section 18 (Step S10). Then, the time (the display time Tn of the image N) until the image reproduction display is terminated in response to the image display end instruction from the operation input section 16 (Step S12) or a frame advance operation is detected by the operation input section 16 (Step S14) is measured (Step S16).

Next, if a frame advance operation is detected by the operation input section 16 (Yes in Step S14), an average value (average display time Ta) of the display time T1, ..., T (n−1), Tn of the images 1, ..., N−1, N is calculated (Step S18).

Next, if the display time Tn of the image N is equal to or greater than the average display time Ta (Ta≤Tn, No in Step S20), the identifier of the image N is extracted by the image identifier extraction section 28 (Step S22). Then, the attention image identifier decision section 30 counts the identifiers of the images 1, ..., N−1, N and estimates an identifier having a high degree of attention of the user (Step S24). In Step S24, the identifier of an image determined to have a high degree of attention is counted, for example, based on the display time, and the identifier large in total value or high in order of total value is determined to have a high degree of attention of the user.

On the other hand, if the display time Tn of the image N is shorter than the average display time Ta (Ta>Tn, Yes in Step S20), the process goes to Step S26 as is.

Next, the identifier of the image N+1 to be displayed following the image N is extracted (Step S26). On the basis of the identifiers determined to have a high degree of attention of the user in Step S24 and the identifier of the image N+1, a determination is made as to whether the image N+1 has a high degree of attention of the user (matches the current mood when the user views the image (at frame advance operation) (Step S28). In Step S28, a comparison is made between the identifier determined to have a high degree of attention of the user in Step S24 and the identifier extracted from the image N+1, and if there is a mutually matched identifier (for example, the number of matched identifiers or the ratio of the number of identifiers is equal to or greater than a predetermined value), the image N+1 is determined to have a high degree of attention of the user. On the contrary, if there is no identifier matched between the identifier determined to have a high degree of attention of the user in Step S24 and the identifier extracted from the image N+1 (for example, the number of matched identifiers or the ratio of the number of identifiers is less than a predetermined value), the image N+1 is determined to have a low degree of attention of the user.

Next, if the image N+1 is determined to have a high degree of attention (Yes in Step S30), the image N+1 is displayed on the image display section 18 (Steps from S32 to S10).

On the contrary, if the image N+1 is determined to have a low degree of attention (No in Step S30), the image N+1 is not displayed, and the identifier of the next image N+2 following the image N+1 is extracted (from Step S34 to Step S26). Then, a determination is made as to whether the image N+2 has a high degree of attention (Steps S28 and S30). Then, if the image N+2 is determined to have a high degree of attention (Yes in Step S30), the image N+2 is displayed on the image display section 18 (Steps from S32 to S10). On the contrary, if the image N+2 is determined to have a low degree of attention (No in Step S30), the image N+2 is not displayed, and on the basis of the identifier of the next image N+3, a determination is made as to whether the image N+3 has a high degree of attention and whether the image N+3 is to be displayed (Steps S26 to S34).

According to the present embodiment, when a predetermined number of frames or more of images are continuously displayed, on the basis of the display time and the identifier of an individual image, the image having a long display time and the image having a similar identifier are determined to have a high degree of attention, so as to display only the images having a high degree of attention in response to a frame advance operation, thereby allowing the frame advance and display of the images matching the mood when the user is viewing the images.

It should be noted that according to the present embodiment, the process of FIG. 4 is performed after a predetermined number of frames are advanced, but, for example, assuming N=1, the process of FIG. 4 may be performed when a first frame of image is displayed.

Alternatively, according to the present embodiment, only the images determined to have a high degree of attention are to be advanced, but, for example, at frame advance operation, display control may be performed so as to increase the display frequency of an image determined to have a high degree of attention or to increase the resolution at display.

Alternatively, when a slide show is performed to display images in an automatic and sequential manner, the attention decision may be made by measuring the display time of an individual image based on the operation content (e.g., temporary stop, frame advance, and frame return) from the operation input section 16.

Second Embodiment

Hereinafter, a second embodiment of the present invention will be described. It should be noted that the entire block diagram of the image display apparatus 10 is the same as that of FIG. 2 described above, and thus the description is omitted.

Figure 5:
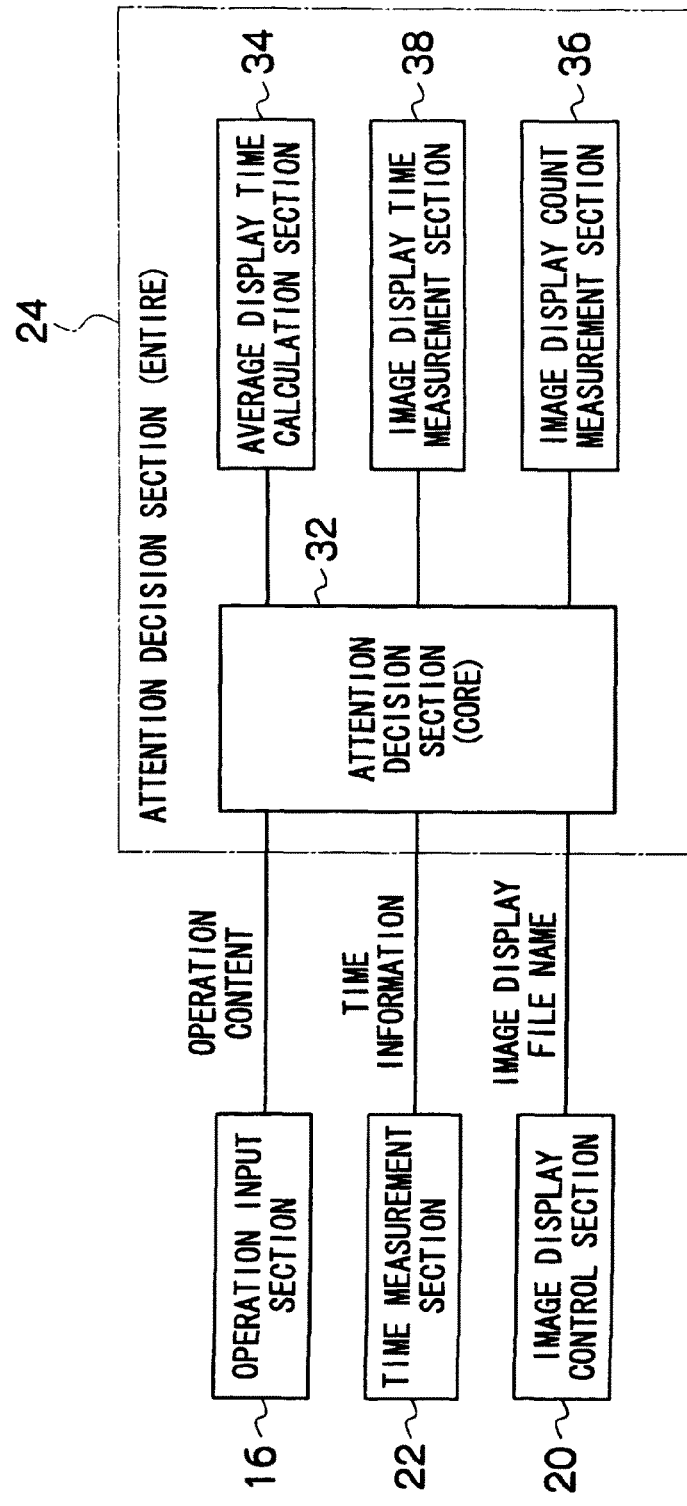
FIG. 5 is a data block diagram illustrating an attention decision section 24 in accordance with a second embodiment of the present invention.

FIG. 5 is a data block diagram illustrating an attention decision section 24 in accordance with a second embodiment of the present invention.

As shown in FIG. 5, the attention decision section 24 in accordance with the present embodiment includes the image display count measurement section 38 in addition to the attention decision section (core section) 32, the average display time calculation section 34, and the image display time measurement section 36.

The image display count measurement section 38 measures the display count (the number of times displayed by a frame advance and a frame advance operation) of an individual image following the image display start instruction. It should be noted that the display count of an individual image is calculated for each image display start instruction in the same manner as the display time of an image and the average display time Ta, and when the image display end instruction is input, the display count is cleared.

The image display time measurement section 36 obtains, from the time measurement section 22, time information indicating the time when an image is displayed on the image display section 18 and the time when the image is switched to another image by frame advance and measures the display time of the image.

The average display time calculation section 34 calculates the average value (average display time Ta) of the display time for each image measured by the image display time measurement section 36. Each time an image is frame-advanced, the average display time Ta is calculated and updated.

The attention decision section (core section) 32 compares the average display time Ta and the display time of an individual image, and determines whether the image has a high degree of attention. For example, the attention decision section (core section) 32 increases the degree of attention of the image having the display time equal to or longer than the average display time Ta, or having the difference or fraction (ratio) between the display time and the average display time Ta equal to or greater than a predetermined value, as well as increases the degree of attention of the image having the display count equal to or greater than a predetermined count (e.g., twice or more). Then, if the degree of attention is equal to or greater than a predetermined value, the attention decision section (core section) 32 determines that the image has a high degree of attention.

Then, in the same manner as in the first embodiment, a display control is performed to advance only the images having a high degree of attention based on the identifier of the image determined to have a high degree of attention.

An image which has a short display time, but is displayed repeatedly (for example, when the user repeatedly views the image for confirmation, or when the user repeatedly views part of the image for confirmation) is estimated to have a high degree of attention of the user. According to the present embodiment, the image display count is used to make the attention decision, thereby allowing the attention decision matching the current mood of the user to be made.

Alternatively, when the image display end instruction is input or when the power is turned off, the display count may be cleared and then may be measured each time the image display start instruction is input. Alternatively, after the image display end instruction is input or after the power is turned off, the display count of an individual image may be recorded as information assigned to the image and the display count accumulated before image display start instruction may be used to obtain the degree of attention.

Alternatively, the attention decision may be made by considering both the accumulated display count and the display count after the image display start instruction.

Alternatively, the degree of attention with respect to the image may be determined, for example, by considering the operation content while the image is being displayed (enlarged display (zoom), and edits). For example, the degree of attention of an image may be increased if many zoom-in operations and edits are performed on the image. For example, even if the edited image is not saved, the image which is enlarged, trimmed, or edited for sharpness and brightness can be determined to have high degree of attention.

Third Embodiment

Hereinafter, a third embodiment of the present invention will be described. It should be noted that the entire block diagram of the image display apparatus 10 is the same as that of FIG. 2, and thus the description is omitted.

Figure 6A:
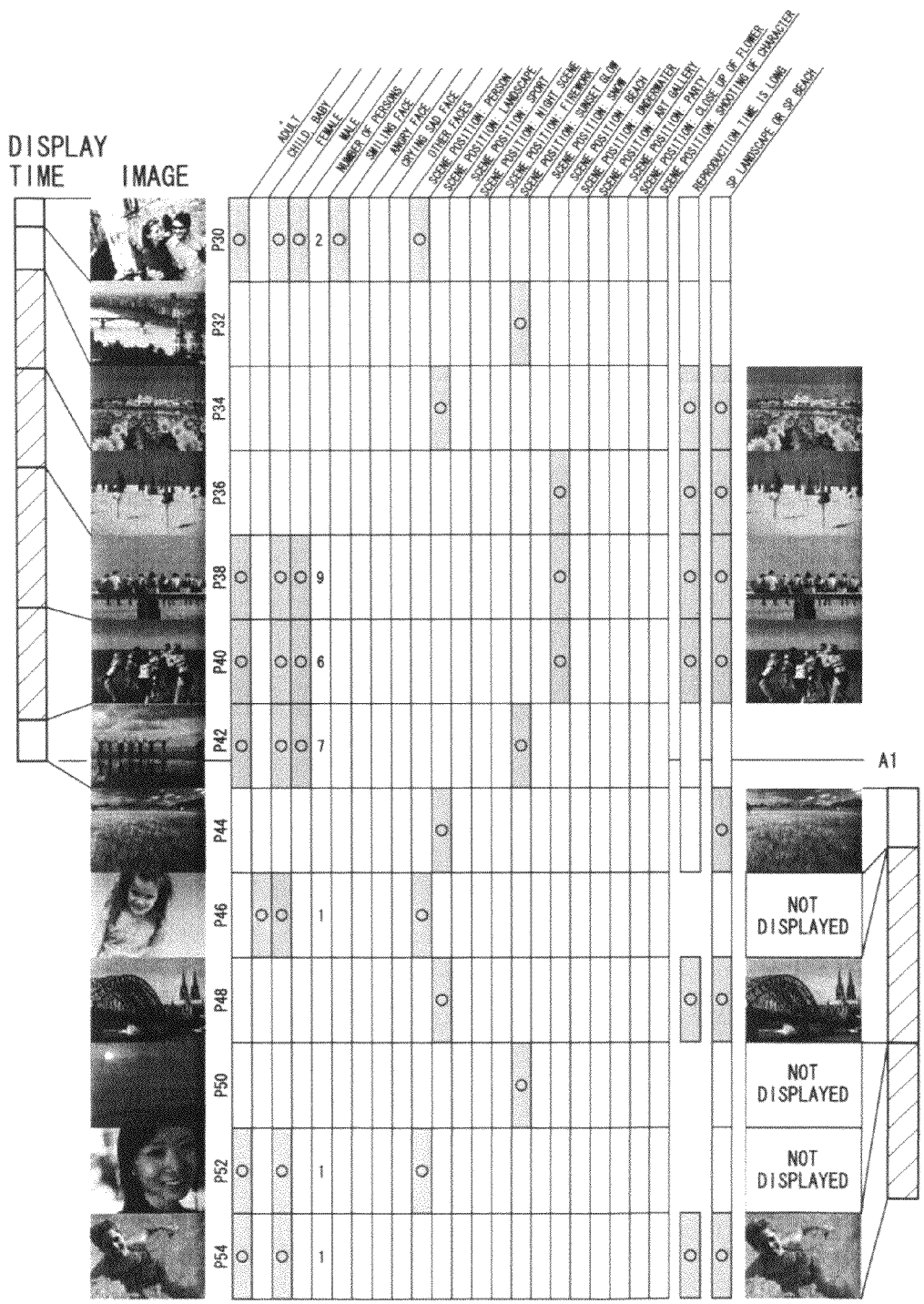
FIGS. 6A and 6B are schematic views illustrating a display control method in accordance with a third embodiment of the present invention.
Figure 6B:
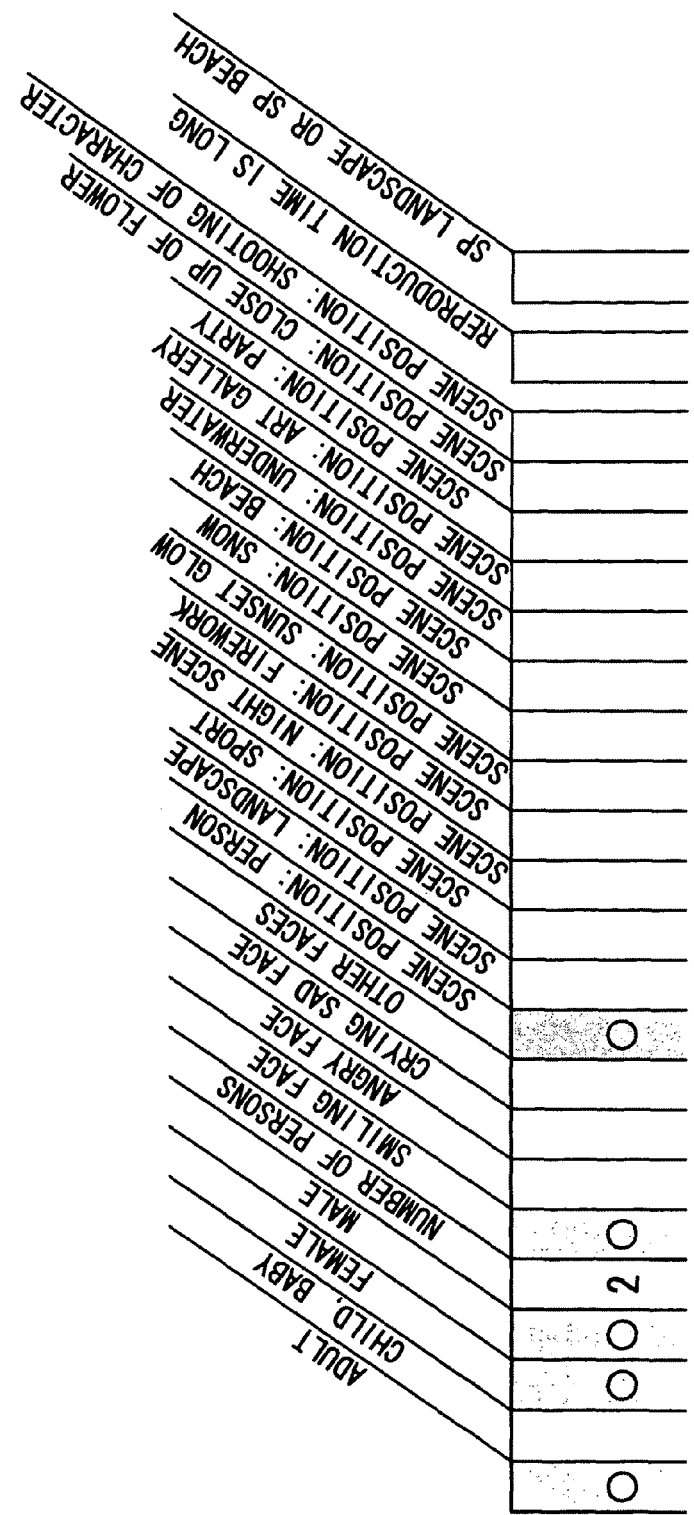
Figure 7B:
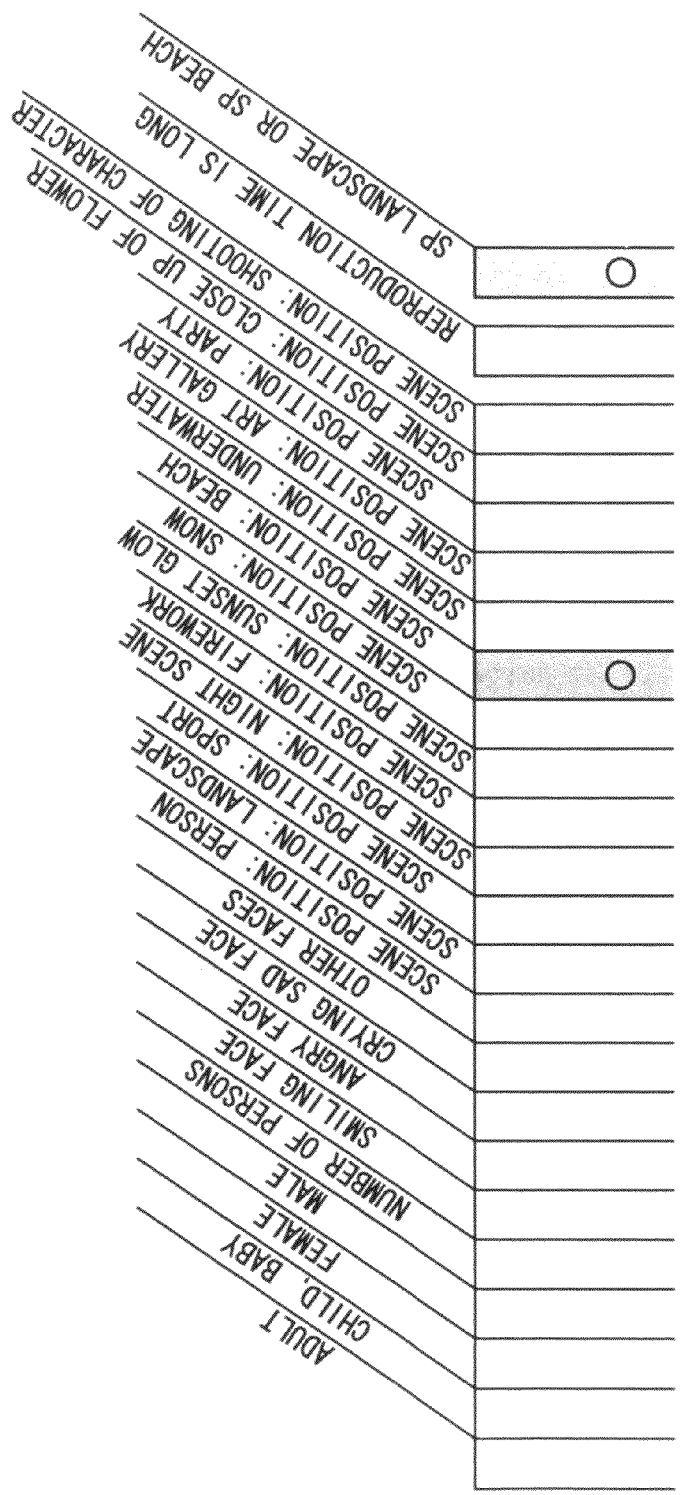

FIG. 6A, FIG. 6B, FIG. 7A and FIG. 7B each is a schematic view illustrating a display control method in accordance with the third embodiment of the present invention. FIG. 6B is an enlarged view of right character portion of FIG. 6A. FIG. 7B is an enlarged view of right character portion of FIG. 7A.

As shown in FIG. 6A, at the point of time (A1) when the images P30 to P42 are advanced, the degree of attention of the user is determined. Then, when a frame advance operation is performed after A1, only the images determined to have a high degree of attention are to be advanced, and the images determined to have a low degree of attention are not displayed.

Subsequently, at the point of time (A2) when the number of frames of an image which is to be advanced and displayed and its display time is shorter than a predetermined reference time Tb is larger than a specified number of frames (hereinafter referred to as an mb frame), the display control for displaying only the images determined to have a high degree of attention is released and the attention decision of the user is made again.

In the examples shown in FIG. 6A and FIG. 7A, during A1, the display time of the images P32, . . . , P40 including the identifier "landscape" or "beach" is longer than the average display time Ta, and thus, after A1, only the images including the identifier "landscape" or "beach" are displayed.

However, after A1, the display time of the image is shorter than the predetermined reference time Tb (shorter interval of frame advance operation), and thus, at the point of A2, the display control is released, and the attention decision of the user is made again.

Figure 8:
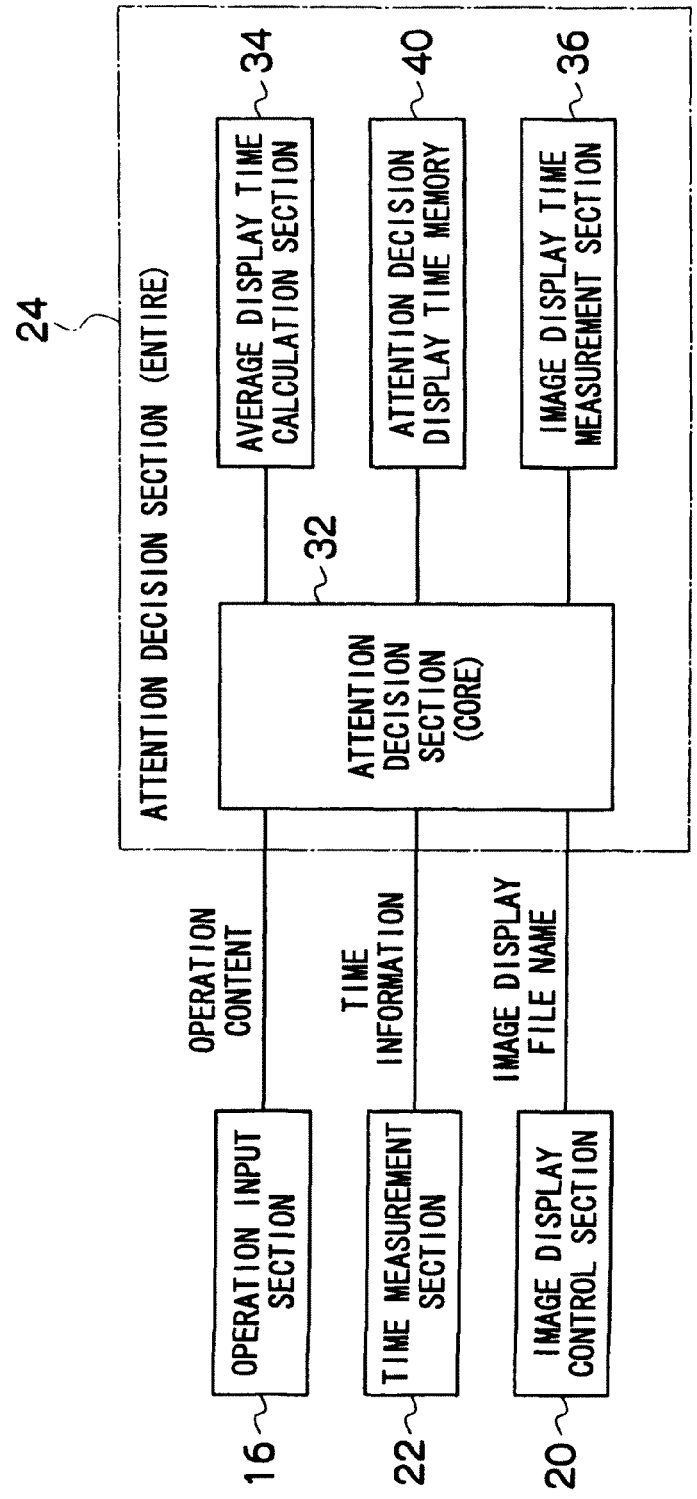
FIG. 8 is a data block diagram illustrating an attention decision section 24 in accordance with the third embodiment of the present invention.

FIG. 8 is a data block diagram illustrating an attention decision section 24 in accordance with the third embodiment of the present invention.

As shown in FIG. 8, the attention decision section 24 in accordance with the present embodiment includes an attention decision display time memory 40, in addition to the attention decision section (core section) 32, the average display time calculation section 34, and the image display time measurement section 36.

The reference time Tb is recorded in the attention decision display time memory (hereinafter referred to as a display time memory) 40.

The attention decision section (core section) 32 compares the average display time Ta calculated by the average display time calculation section 34 and the display time of an individual image measured by the image display time measurement section 36, and determines whether the image has a high degree of attention. For example, if the display time of an image is equal to or longer than the average display time Ta, the attention decision section (core section) 32 determines that the image has a high degree of attention. Alternatively, if the difference or fraction (ratio) between the display time of an image and the average display time Ta is equal to or greater than a predetermined value, the attention decision section (core section) 32 may determine that the image has a high degree of attention.

Next, in the same manner as in the above first embodiment, the identifier is extracted and counted from the images having a high degree of attention from among the displayed images, and the identifier having a high degree of attention of the user is estimated. Then, display control is started to selectively display, on the image display section 18, the image having an identifier with a high degree of attention of the user in response to a frame advance operation.

The attention decision section (core section) 32 obtains, from the image display time measurement section 36, the display time of the image displayed on the image display section 18 after the above display control was started, and then, compares the display time with the reference time Tb recorded in the display memory 40. If the display time of an image is shorter than the reference time Tb, 1 is added to the incorrect decision count m (0 at the time when the image display starts), and the added count is recorded in the display memory 40.

Then, a frame advance operation is repeated, and when the incorrect decision count m exceeds a specified count mb, the attention decision section (core section) 32 notifies the CPU 12 that the incorrect decision count m exceeds the specified count mb.

When a notice indicating that the incorrect decision count m exceeds the specified count mb is received, the CPU 12 releases the above display control and executes the attention decision again by controlling the individual sections of the image display apparatus 10.

Figure 9:
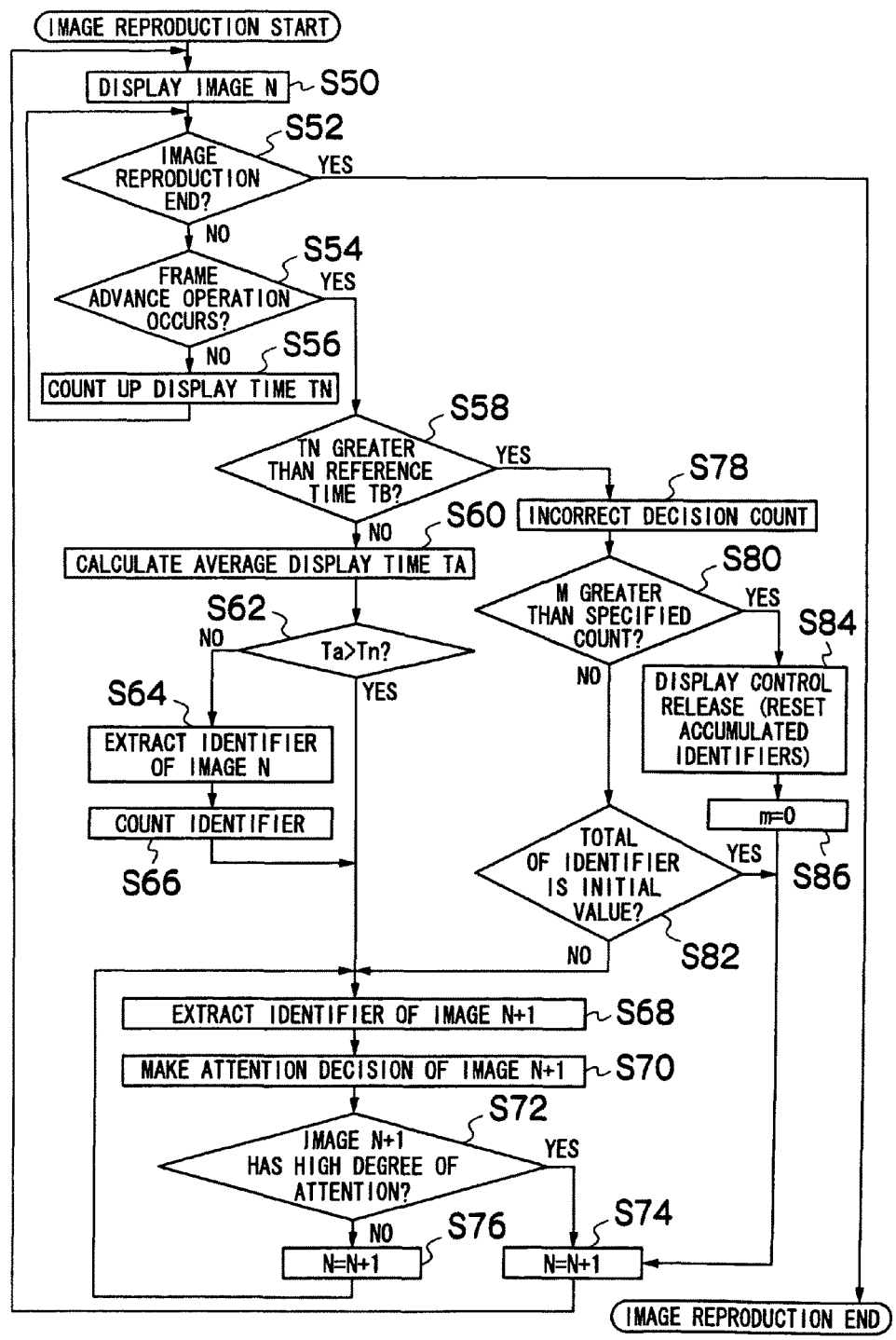
FIG. 9 is a flowchart illustrating a display control method in accordance with the third embodiment of the present invention.

FIG. 9 is a flowchart illustrating the display control method in accordance with the third embodiment of the present invention.

As shown in FIG. 9, when the image display start instruction is detected, a first frame of image 1 is displayed on the image display section 18. Then, a predetermined number of frames (assume (N−1) frames) of images are displayed based on the frame advance operation from the operation input section 16. Here, the images 1, . . . , N−1 are advanced in the order of time and date when the image data was shot, in the order of time and date when the image data was updated, in the order of file name, in the order of size, or in the order of type (for each file format). Then, when the individual images 1, . . . , N−1 are displayed on the image display section 18, the display time (T1, . . . , T (n−1)) from the time when an image is displayed to the time when the image was advanced is measured (counted). In addition, the identifiers of the images 1, . . . , N−1 are extracted and counted.

Next, an Nth frame of image N is read from the image recording reproduction section 14 and is displayed on the image display section 18 (Step S50). Then, the time (the display time Tn of the image N) until the image reproduction display is terminated in response to the image display end instruction from the operation input section 16 (Step S52) or a frame advance operation is detected by the operation input section 16 (Step S54) is measured (Step S56).

Next, if a frame advance operation is detected by the operation input section 16 (Yes in Step S54), a determination is made as to whether the display time Tn of the image N is shorter than the reference time Tb (Step S58).

If the display time Tn of the image N is equal to or longer than the reference time Tb (No in Step S58), the average value (average display time Ta) of the display time T1, . . . , T(n−1), Tn of the images 1, . . . , N−1, N is calculated (Step S60). Then, in Steps S50 to S76, attention decision and display control are performed on the image. It should be noted that the processes of Steps S60 to S76 are the same as the processes of Steps S18 to S34 in FIG. 4 respectively, and thus the description is omitted.

On the contrary, if the display time Tn of the image N is shorter than the reference time Tb (Yes in Step S58), 1 is added to the incorrect decision count m (Step S78). Then, if the incorrect decision count m is equal to or less than a specified count mb (e.g., mb=5) (No in Step S80), a determination is made as to whether the total value of the identifiers is an initial value or not (Step S82). In Step S82, the identifiers of the images displayed after the image display start instruction are counted. Then, if the total value of the individual identifiers are the same, or the difference between the upper limit and the lower limit of the total value of the individual identifiers is equal to or less than a predetermined value, and the identifier having a high degree of attention of the user cannot be identified, the total value of the identifiers is determined to be an initial value.

If the total value of the identifiers is not the initial value (No in Step S82), the process goes to Step S68, and the display control continues. On the contrary, if the total value of the identifiers is the initial value (Yes in Step S82), the (N+1)th frame of image is displayed on the image display section 18 (Steps S74 to S50).

Then, the processes of Steps S50 to S82 are repeated. When the incorrect decision count m exceeds the specified count mb (Yes in Step S80), the display control is released (Step S84), and the (N+1)th frame of image is displayed on the image display section 18 (Steps S74 to S50), and the incorrect decision count is set to the initial value (zero) (Step S86).

According to the present embodiment, only the images having a high degree of attention in response to a frame advance operation can be displayed, thereby allowing the frame advance of the images matching the mood when the user is viewing the images. Further, according to the present embodiment, for example, if the image display apparatus 10 makes an incorrect attention decision, or if the tendency of the images the user wants to view during viewing of the images is changed, the frame advance display matching the mood can be achieved by making the attention decision again.

Fourth Embodiment

Hereinafter, a fourth embodiment of the present invention will be described. It should be noted that the entire block diagram of the image display apparatus 10 is the same as that of FIG. 2, and thus the description is omitted.

When no identifier is assigned to the input image, the image display apparatus 10 in accordance with the present embodiment makes an attention decision of the user by assigning an identifier to the image.

Figure 10A:
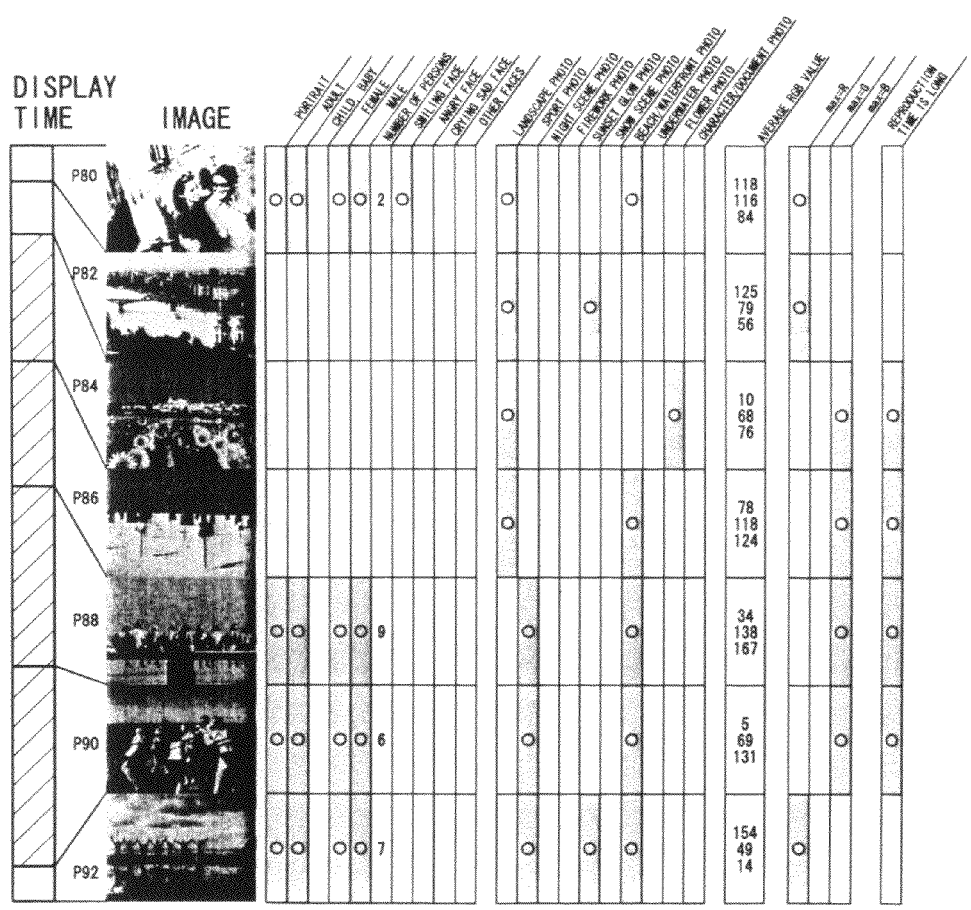
FIGS. 10A and 10B are schematic views illustrating a display control method in accordance with a fourth embodiment of the present invention.
Figure 10B:
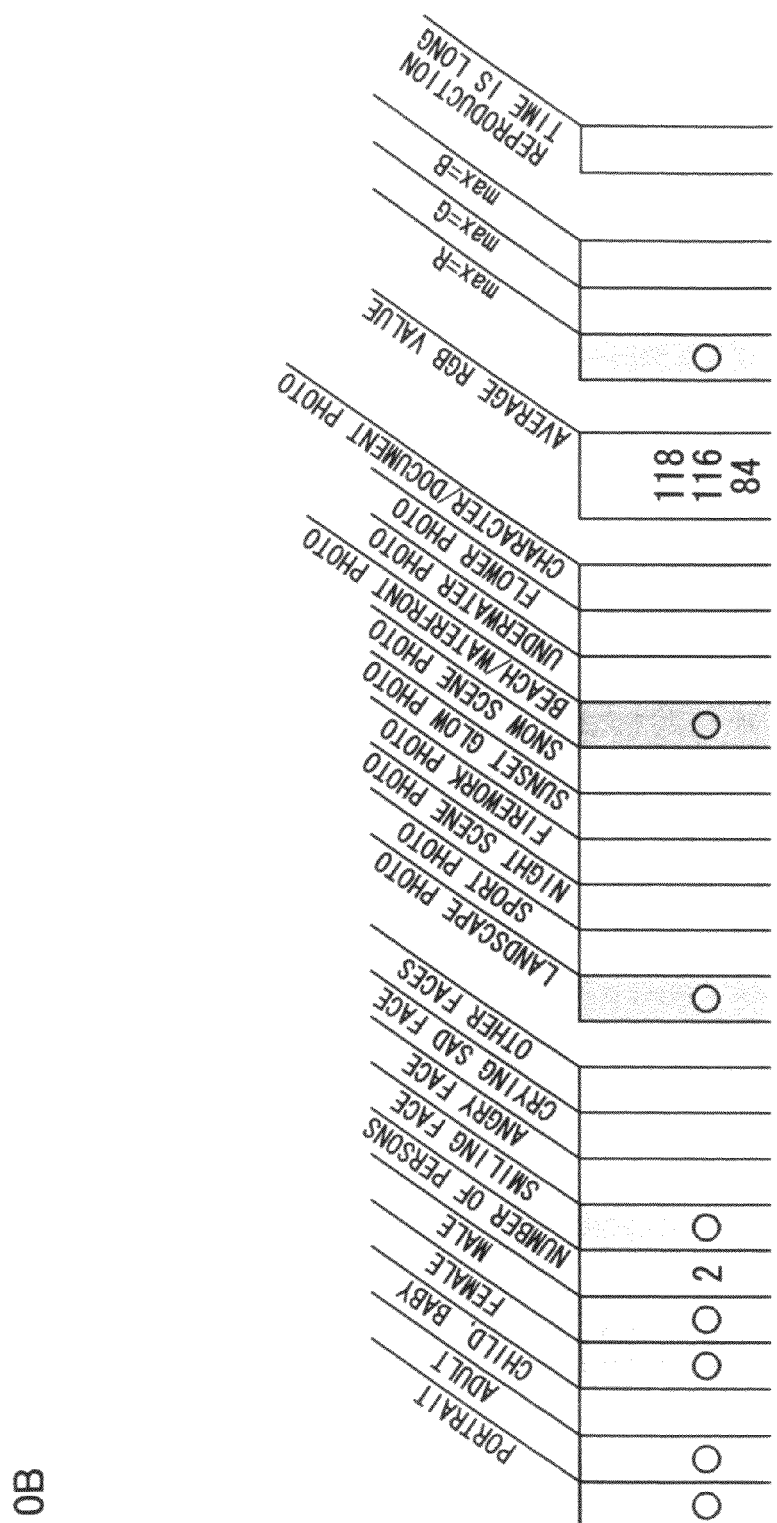

FIGS. 10A and 10B are schematic views illustrating the display control method in accordance with the fourth embodiment of the present invention. FIG. 10B is an enlarged view of upper character portion of FIG. 10A.

In the examples shown in FIG. 10A, an individual image passes through scene analysis and an identifier indicating a scene position is assigned thereto. For example, the image P80 passes through scene analysis and identifiers indicating a portrait and a landscape photo as well as a beach/waterfront photo are assigned thereto. The scene analysis is performed using a human face image, an animal, a color (R, G, B), and a color distribution from the image.

Further, in the examples shown in FIG. 10A, an identifier (for example, an average RGB value, a mode value, or a maximum value of the entire screen of the individual image) indicating the color trend (R, G, B) of the individual image is assigned thereto.

As described above, assigning an identifier to an individual image allows the attention decision of the user to be easily made. In the examples shown in FIG. 10A, a comparison is made among the average R, G, and B values. Since the display time of the images P82, . . . , P90 having a maximum average B value is long, the image having a blue trend is determined to have a high degree of attention of the user. Accordingly, for subsequent frame advance display, the image display apparatus 10 performs the display control to advance only the images having a maximum average B value (images having a blue trend) from among the average R, G, and B values.

It should be noted that the identifiers assigned through the image analysis are not limited to the above. For example, a specific object such as a mountain, a beach, a sea, a river, a vehicle (e.g., car, ship), a person, or an animal (companion animal) is detected from the image and the identifier indicating the detected object may be assigned. For detecting a person, when a database storing face images of persons is provided to detect a specific person, more detailed analysis can be made. In addition, for detecting an animal, when a database storing animal images for each kind of animal (dog, miniature dachshund) can be provided to detect a specific kind of animal, more detailed analysis can be made.

Alternatively, an enlarged display of a person or an animal detected from the image may be performed in response to a frame advance operation.

Figure 11:
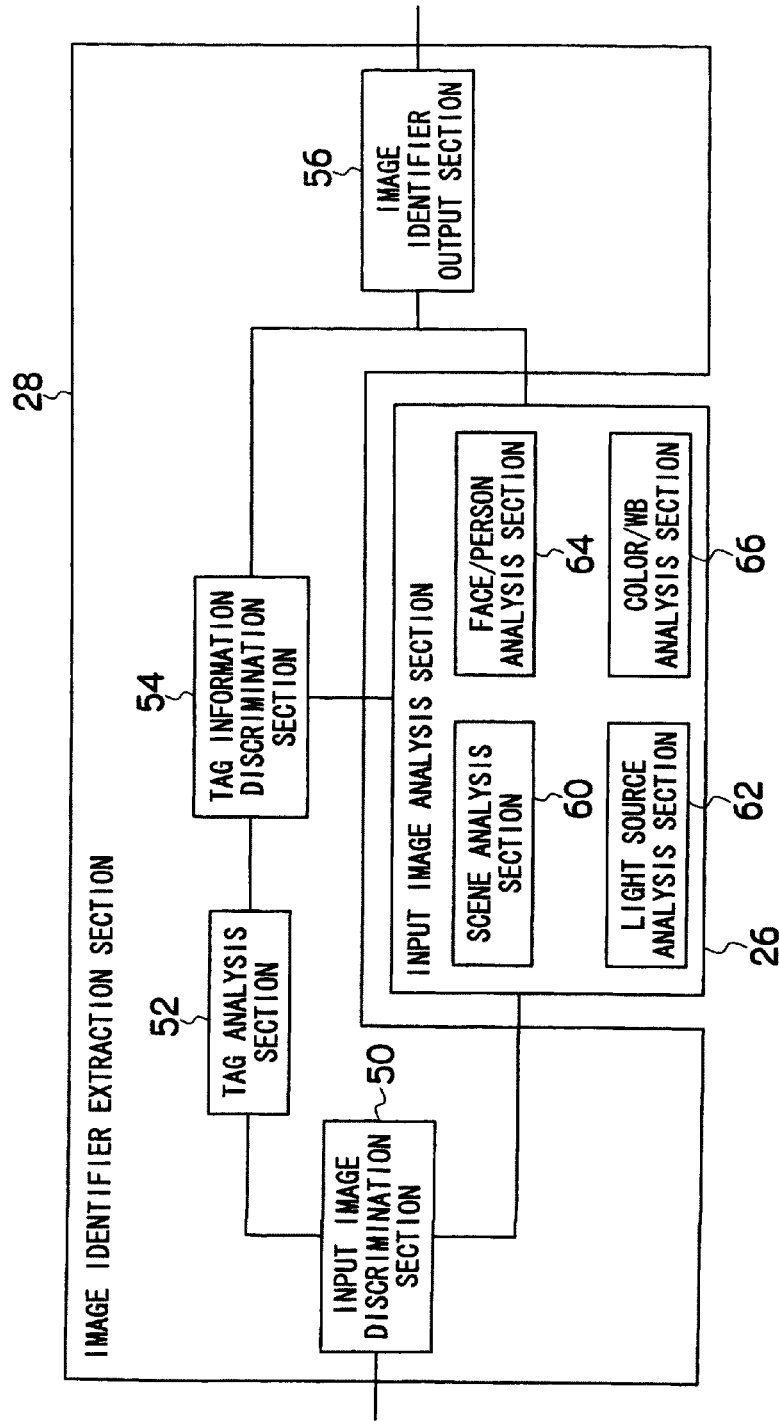
FIG. 11 is a data block diagram illustrating a process of assigning an identifier to an image.

FIG. 11 is a data block diagram illustrating a process of assigning an identifier to an image.

As shown in FIG. 11, the image identifier extraction section 28 includes an input image discrimination section 50, a tag analysis section 52, a tag information discrimination section 54, and an image identifier output section 56.

The input image discrimination section 50 analyzes an image read from the image recording reproduction section 14 in response to a frame advance operation of the user and discriminates whether auxiliary information (tag information) is assigned or not. Then, the input image discrimination section 50 extracts tag information from the image having tag information, and outputs the tag information to the tag analysis section 52. On the contrary, if the image has no tag information (for example, an image edited by image processing software), the input image discrimination section 50 outputs the image to the input image analysis section 26.

The tag analysis section 52 converts the tag information input from the input image discrimination section 50 to data for recognition, and outputs the data to the tag information discrimination section 54.

The tag information discrimination section 54 analyzes the tag information to discriminate whether a predetermined identifier (an identifier used to make an attention decision, hereinafter, referred to as an analysis tag) is included in the tag information. If an analysis tag is included, the tag information discrimination section 54 outputs the extracted tag information data for recognition to the image identifier output section 56. If an analysis tag is included, the tag information discrimination section 54 instructs the input image analysis section 26 to perform analysis on the image.

The input image analysis section 26 performs a predetermined image analysis, adds an identifier to the image, and outputs the image identifier to the image identifier output section 56.

The image identifier output section 56 outputs the tag information data for recognition to the attention decision section 24.

Hereinafter, an input image analysis will be described. As shown in FIG. 10A, the input image analysis section 26 includes a scene analysis section 60, a light source analysis section 62, a face/person analysis section 64, and a color/WB analysis section 66.

The color/WB analysis section 66 analyzes an input image to obtain information (color trend) indicating a color (R, G, B) value, a color distribution, and an average value. Further, the color/WB analysis section 66 obtains, from the tag information, information about white balance adjustment (gain) when the input image is shot.

The light source analysis section 62 estimates the light source under shooting environment (for example, indoors, outdoors, sunset glow, snow scene, or underwater) based on the color and white balance gain in the image obtained by the color/WB analysis section 66.

The face/person analysis section 64 detects a face area including a face of a person in the image and counts the number of persons appearing in the image. Moreover, the face/person analysis section 64 analyzes the face image of the detected person to identify the sex, the age group, and the facial expression of the person.

On the basis of the above analysis result of the light source and the detection result of the person, the scene analysis section 60 assigns an identifier indicating the scene and the color trend to the input image.

It should be noted that the input image analysis section 26 may analyze an image sharpness or a tone of the entire screen (gamma value) in addition to a scene, a face/person, and a light source/color/WB, or may determine the shooter.

Figure 12:
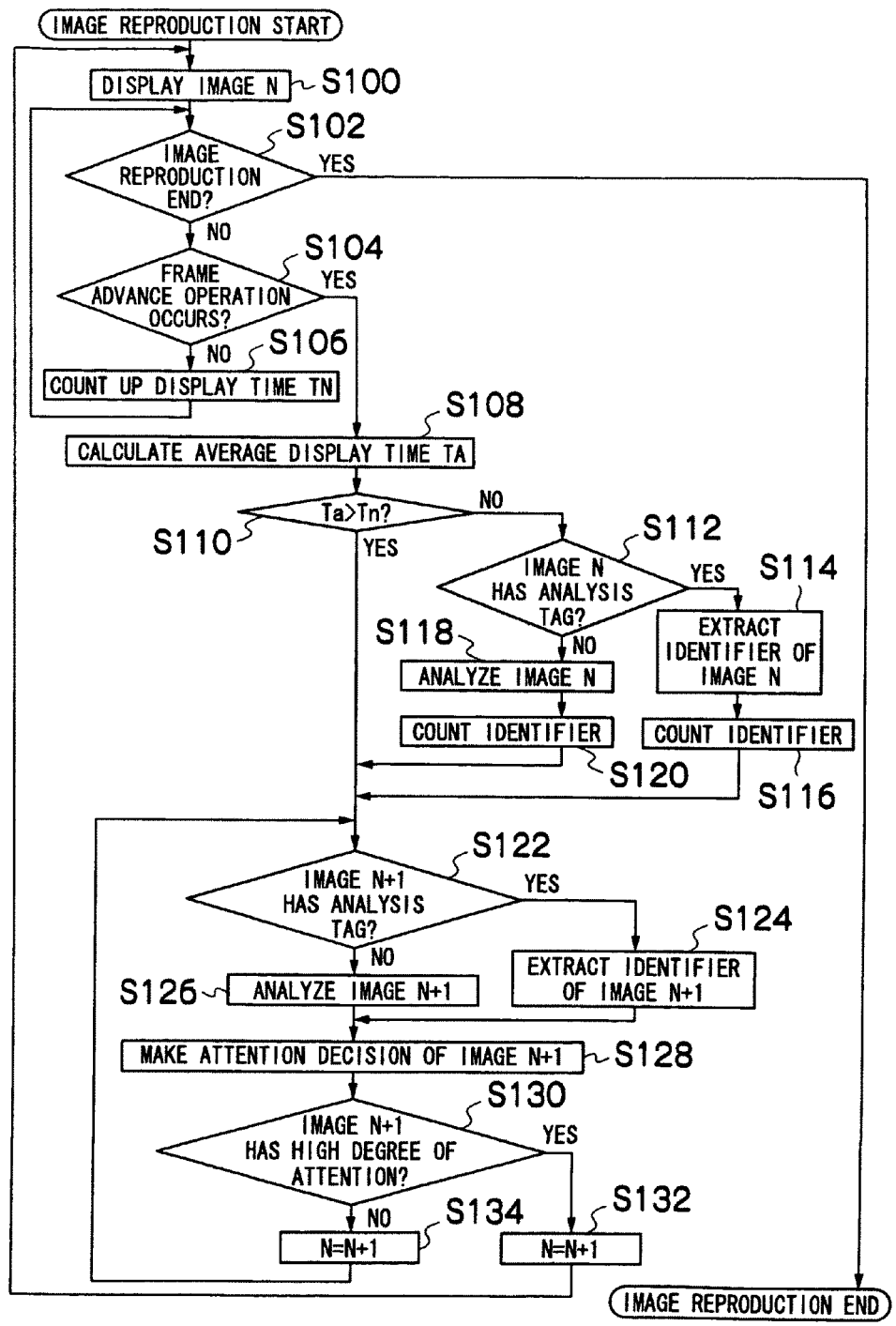
FIG. 12 is a flowchart illustrating the display control method in accordance with the fourth embodiment of the present invention.

FIG. 12 is a flowchart illustrating the display control method in accordance with the fourth embodiment of the present invention.

As shown in FIG. 12, when the image display start instruction is detected, a first frame of image 1 is displayed on the image display section 18. Then, a predetermined number of frames (assume (N−1) frames) of images are displayed based on the frame advance operation from the operation input section 16. Here, the images 1, . . . , N−1 are advanced and displayed, for example, in the order of time and date when the image data was shot, in the order of time and date when the image data was updated, in the order of file name, in the order of size, or in the order of type (for each file format). Then, when the individual images 1, . . . , N−1 are displayed on the image display section 18, the display time (T1, . . . , T (n−1)) from the time when an image is displayed to the time when the image was advanced is measured (counted). In addition, the identifiers of the images 1, . . . , N−1 are extracted. Then, an image analysis is performed on the image which does not have an identifier (analysis tag) to be used to make an attention decision and an identifier is written to the image.

Next, an Nth frame of image N is read from the image recording reproduction section 14 and is displayed on the image display section 18 (Step S100). Then, the time (the display time Tn of the image N) until the image reproduction display is terminated in response to the image display end instruction from the operation input section 16 (Step S102) or a frame advance operation is detected by the operation input section 16 (Step S104) is measured (Step S106).

Next, if a frame advance operation is detected by the operation input section 16 (Yes in Step S104), an average value (average display time Ta) of the display time T1, . . . , T (n−1), Tn of the images 1, . . . , N−1, N is calculated (Step S108).

Next, if the display time Tn of image N is equal to or greater than the average display time Ta (Ta≤Tn, No in Step S110), and if the image N has an analysis tag (Yes in Step S112), the identifier of image N is extracted by the image identifier extraction section 28 (Step S114). Then, the attention image identifier decision section 30 counts the identifiers of the images 1, . . . , N−1, N and estimates an identifier having a high degree of attention of the user (Step S116). In Step S116, the identifier of an image determined to have a high degree of attention is counted, for example, based on the display time, and the identifier large in total value or high in order of total value is determined to have a high degree of attention of the user.

On the contrary, if the display time Tn of image N is equal to or greater than the average display time Ta (T≤Tn, No in Step S110), and if the image N has no analysis tag (No in Step S112), the image N is analyzed by the input image analysis section 26, a scene analysis and a color trend determination are performed, and an analysis tag is assigned to the image N (Step S118). Then, the attention image identifier decision section 30 counts the identifiers of the images 1, . . . , N−1, N and estimates an identifier having a high degree of attention of the user (Step S120).

On the other hand, if the display time Tn of image N is shorter than the average display time Ta (Ta>Tn, Yes in Step S110), the process goes to Step S122 as is.

Next, the tag information of the image N+1 to be displayed following the image N is read. If the image N+1 has an analysis tag (Yes in Step S122), the identifier of the image N+1 is extracted (Step S124).

On the contrary, if the image N+1 has no analysis tag (No in Step S122), the image N+1 is analyzed by the input image analysis section 26, a scene analysis and a color trend determination are performed, and an analysis tag is assigned to the image N+1 (Step S126).

Next, on the basis of the identifiers determined to have a high degree of attention of the user and the identifier of the image N+1, a determination is made as to whether the image N+1 has a high degree of attention of the user (matches the current mood when the user views the image (at frame advance operation) (Step S128). In Step S128, for example, a comparison is made between the identifier determined to have a high degree of attention of the user and the identifier extracted from the image N+1, and if there is a mutually matched identifier (for example, the number of matched identifiers or the ratio of the number of identifiers is equal to or greater than a predetermined value), the image N+1 is determined to have a high degree of attention of the user. On the contrary, if there is no identifier mutually matched between the identifier determined to have a high degree of attention of the user and the identifier extracted from the image N+1 (for example, the number of matched identifiers or the ratio of the number of identifiers is less than a predetermined value), the image N+1 is determined to have a low degree of attention of the user.

Next, if the image N+1 is determined to have a high degree of attention (Yes in Step S136), the image N+1 is displayed on the image display section 18 (Steps from S132 to S100).

On the contrary, if the image N+1 is determined to have a low degree of attention (No in Step S130), the image N+1 is not displayed, and the identifier of the next image N+2 following the image N+1 is extracted (from Step S134 to Step S122). Then, a determination is made as to whether the image N+2 has a high degree of attention (Steps S122 and S130). Then, if the image N+2 is determined to have a high degree of attention (Yes in Step S130), the image N+2 is displayed on the image display section 18 (Steps from S132 to S100).

On the contrary, if the image N+2 is determined to have a low degree of attention (No in Step S130), the image N+2 is not displayed, and a determination is made until an image having a high degree of attention is detected (Steps S122 to S134).

According to the present embodiment, an image which has no identifier (analysis tag) to be used to make an attention decision is analyzed to assign an analysis tag thereto, thereby allowing the frame advance and display of the images matching the mood of the user regardless of the format of the image data file and the content of the tag information.

It should be noted that the input image analysis may be performed when the image is recorded in the image recording reproduction section 14.

Alternatively, according to the present embodiment, only the images determined to have a high degree of attention are to be advanced, but, for example, at frame advance operation, a display control may be performed so as to increase the display frequency of an image determined to have a high degree of attention or to increase the resolution at display.

Alternatively, when a slide show is performed to display images in an automatic and sequential manner, the attention decision may be made by measuring the display time of an individual image based on the operation content (e.g., temporary stop, frame advance, and frame return) from the operation input section 16.

It should be noted that the image display apparatus, the display control method, and the display control program in accordance with the present invention can be provided not only as an image viewer (an image viewing device and an image filing device), but also as a device capable of displaying an image (e.g., an electronic camera, a movie, an electronic dictionary, a cell phone, a personal computer, and a TV) and a display control program for controlling the device.

What is claimed is:

1. A display control method, comprising:
    receiving an input of a frame advance instruction of an image displayed on an image display section, and making a determination of a degree of attention of a user with respect to the image displayed on the image display section after a predetermined number of frames are advanced in response to the frame advance instruction, based on a duration of display time when the image is displayed and an average duration of display time of the predetermined number of frames of images, the predetermined number of frames of images including at least an image being lastly displayed in response to the frame advance instruction, after an image display start instruction is detected;
    detecting an attention identifier which is assigned to an attention image determined to have a value of the degree of attention equal to or greater than a predetermined value in said receiving the input, the attention identifier indicating a plurality of attributes of the attention image;
    detecting images to be displayed having the attention identifier, performing a display control of the image display section so as to display only the images to be displayed in response to a frame advance instruction received after the display control is started; and
    calculating and updating the average duration of display time each time the image is frame-advanced,
    wherein, when a frame advance operation is detected after the predetermined number of frames of images are displayed, on a basis of a determination result of the degree of attention, the image display section displays image data determined to have a highest degree of attention of the user from among image data later in a frame advance order,
    wherein, the degree of attention of the user with respect to the image is converted to a numerical value based on a number of identifiers matched between an identifier determined to have the highest degree of attention of the user and an identifier extracted from the image or a ratio of a number of identifiers, and if the numerical value of the degree of attention is equal to or greater than a predetermined value, the image is to be frame advanced.

2. The display control method according to claim 1, wherein in said receiving the input, the degree of attention of the user with respect to the image is determined based on a number of times the image is displayed, a presence or absence of an instruction input for an enlarged display with respect to the image or a number of times the instruction is input.

3. The display control method according to claim 1, wherein in said detecting the attention identifier, an identifier extracted from the attention image is counted for each attribute, and the identifier is detected as an attention identifier based on a total value.

4. The display control method according to claim 1, further comprising:
    terminating the display control when a number of images having the duration of display time shorter than a predetermined time exceeds a predetermined value, or when a ratio of the number of images having the duration of display time shorter than the predetermined time to a total number of images displayed on the image display section after the display control is started exceeds a predetermined value; and making the determination of the degree of attention of the user with respect to the image again when the display control is terminated.

5. The display control method according to claim 1, further comprising:

analyzing an image to which no identifier is assigned, and assigning an identifier to the image.

6. The display control method according to claim 5, wherein in said analyzing the image, at least one piece of information is obtained from among an object appearing in the image, a scene setting, and a color trend, and an identifier indicating the information is assigned to the image.

7. The display control method according to claim 1, wherein an identifier of the image comprises at least one piece of information indicating an object appearing in the image, a scene, and a shooting environment.

8. The display control method according to claim 1, further comprising:

clearing a result of the determination of the degree of attention of the user made in said receiving the input if an image display end instruction is detected.

9. A non-transitory programmable storage medium tangibly embodying a program of machine-readable instructions executable by a digital processing apparatus to perform:

an image display function which displays an image on an image display apparatus;

a frame advance instruction function which receives an input of a frame advance instruction of an image displayed on the image display apparatus;

an attention decision function which makes a determination of a degree of attention of a user with respect to the image after a predetermined number of frames of images are advanced in response to the frame advance instruction, based on a duration of display time when the image is displayed and an average duration of display time of the predetermined number of frames of images, the predetermined number of frames of images including at least an image being lastly displayed in response to the frame advance instruction, after an image display start instruction is detected;

an attention identifier detection function which detects an attention identifier from an attention image determined to have a value of the degree of attention equal to or greater than a predetermined value by the attention decision function; and a display control function which detects images to be displayed having the attention identifier and performs the display control so as to display only the images to be displayed in response to a frame advance instruction received after the display control is started, wherein each time the image is frame-advanced, the average duration of display time is calculated and updated, wherein, when a frame advance operation is detected after the predetermined number of frames of images are displayed, on a basis of a determination result of the degree of attention, the image display section displays image data determined to have a highest degree of attention of the user from among image data later in a frame advance order, wherein, the degree of attention of the user with respect to the image is converted to a numerical value based on a number of identifiers matched between an identifier determined to have the highest degree of attention of the user and an identifier extracted from the image or a ratio of a number of identifiers, and if the numerical value of the degree of attention is equal to or greater than a predetermined value, the image is to be frame advanced.

10. The non-transitory programmable storage medium according to claim 9, wherein the attention decision by the attention decision function is performed based on a number of times the image is displayed.

11. The non-transitory programmable storage medium according to claim 9, wherein the digital processing apparatus to perform an enlarged instruction function which receives an instruction input for an enlarged display of the image, and wherein the attention decision by the attention decision function is performed based on a presence or absence of an instruction input for the enlarged display or a number of times the instruction is input.

12. The non-transitory programmable storage medium according to claim 9, wherein an identifier extracted from the attention image is counted for each attribute, and the detection of an attention identifier by the attention identifier detection function is performed based on a total value.

13. The non-transitory programmable storage medium according to claim 9, wherein, when a number of images having the duration of display time shorter than a predetermined time exceeds a predetermined value, or when a ratio of the number of images having the duration of display time shorter than the predetermined time to a total number of images displayed on the image display apparatus after the display control is started exceeds a predetermined value, the display control is terminated, and wherein, when the display control function terminates the display control, the attention decision function makes the determination of the degree of attention of the user with respect to the image again.

14. The non-transitory programmable storage medium according to claim 9, wherein the digital processing apparatus to perform an image analysis function which analyzes an image to which no identifier is assigned, and assigns an identifier to the image.

15. The non-transitory programmable storage medium according to claim 14, wherein the image analysis function obtains at least one piece of information from among an object appearing in the image, a scene setting, and a color trend, and assigns an identifier indicating the information to the image.

16. The non-transitory programmable storage medium according to claim 9, wherein an identifier of the image comprises at least one piece of information indicating an object appearing in the image, a scene, and a shooting environment.

17. The non-transitory programmable storage medium according to claim 9, wherein the display control function clears a result of the determination of the degree of attention of the user made by the attention decision function if an image display end instruction is detected.

* * * * *